United States Patent
Mutschler, III

(10) Patent No.: US 6,289,501 B1
(45) Date of Patent: *Sep. 11, 2001

(54) METHOD FOR GENERATING SIMPLE DOCUMENT TYPE DEFINITIONS

(75) Inventor: Eugene Otto Mutschler, III, San Clemente, CA (US)

(73) Assignee: Unisys Corp., Blue Bell, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/282,345

(22) Filed: Mar. 31, 1999

(51) Int. Cl.$^7$ .................................................. G06F 9/45

(52) U.S. Cl. .............................................. 717/1; 707/513

(58) Field of Search .................................. 717/1, 2, 3, 5, 717/8; 707/3, 4, 10, 100, 103, 513; 709/315, 316

(56) References Cited

U.S. PATENT DOCUMENTS

| | | | |
|---|---|---|---|
| 5,761,499 | * 6/1998 | Sonderegger | 707/10 |
| 5,890,158 | * 3/1999 | House et al. | 707/10 |
| 5,970,490 | * 10/1999 | Morgenstern | 707/10 |
| 6,018,627 | * 1/2000 | Iyengar et al. | 395/701 |
| 6,167,564 | * 12/2000 | Fontana et al. | 717/1 |

FOREIGN PATENT DOCUMENTS

1004987 * 5/2000 (EP) .............................. G06T/15/00

OTHER PUBLICATIONS

Klely, "XML offers standard way of extending HTML", InformationWeek, Oct. 1997, pp. 8–12.*

Levin, "Component modeling tools encourage reuse", InformationWeek, Mar. 1997, pp 6–11.*

* cited by examiner

Primary Examiner—Kakali Chaki
(74) Attorney, Agent, or Firm—Alfred W. Kozak; Mark T. Starr; Lise A. Rode

(57) ABSTRACT

A method is disclosed for use in a software development framework that has a repository and at least two software systems. The repository contains a meta-model and the software systems store instances of the meta-model. The method enables exchange of the instances of the meta-model among the software systems using a generalized data transfer language. The method comprises the steps of extracting a fixed component and a variable component of the metadata; parsing the variable component into constituent components; and, transforming each of the constituent components into corresponding components of a software language. The previous two steps are repeated for each instance of the variable component. Next, each instance of the variable component is transformed into corresponding components of the generalized software language. The fixed components are then transformed into corresponding components of the generalized software language. After this, the corresponding components are distributed among the software systems, where they are used as the format specification for the generalized data transfer language transport of the instances of the meta-model among the software systems.

15 Claims, 18 Drawing Sheets

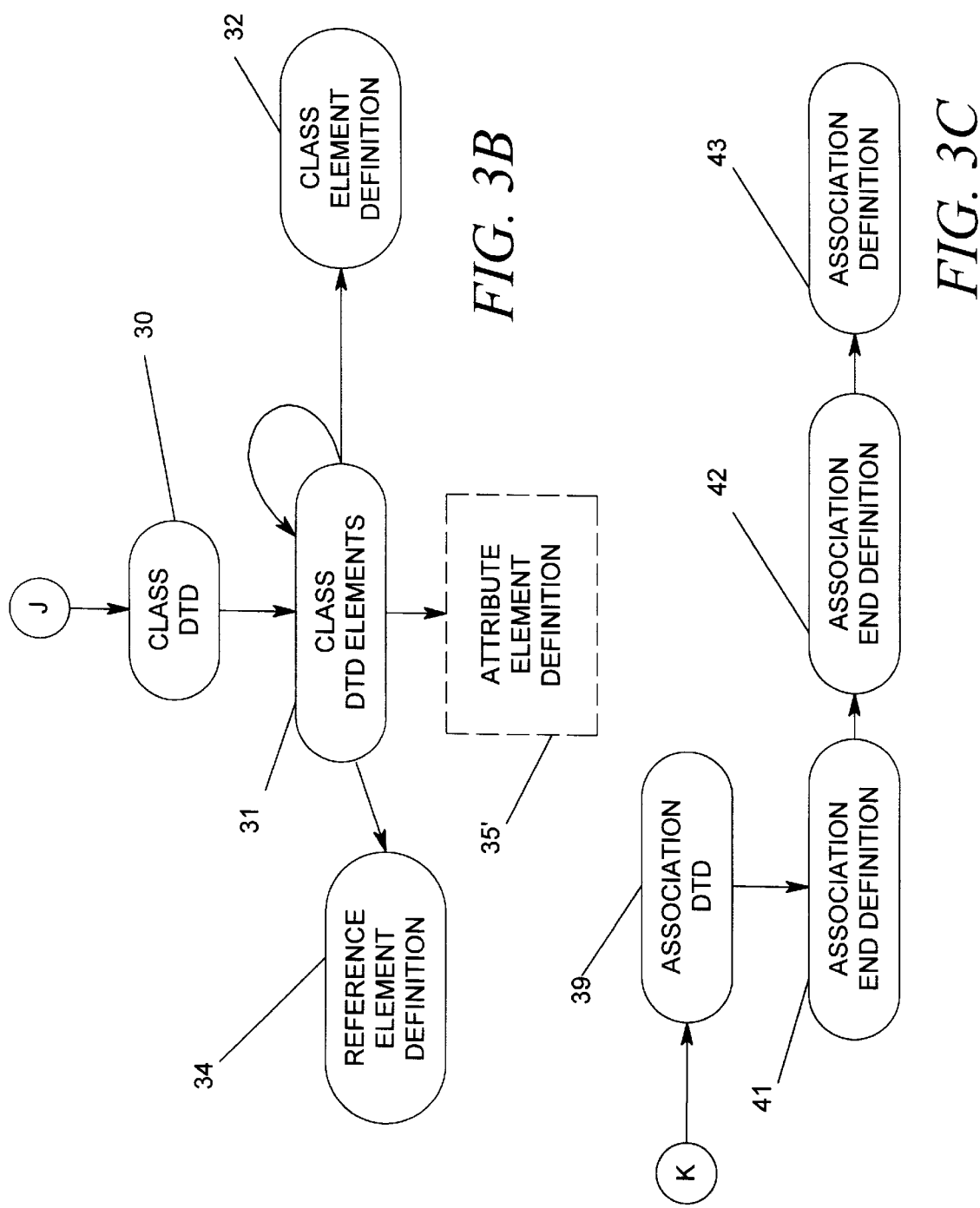

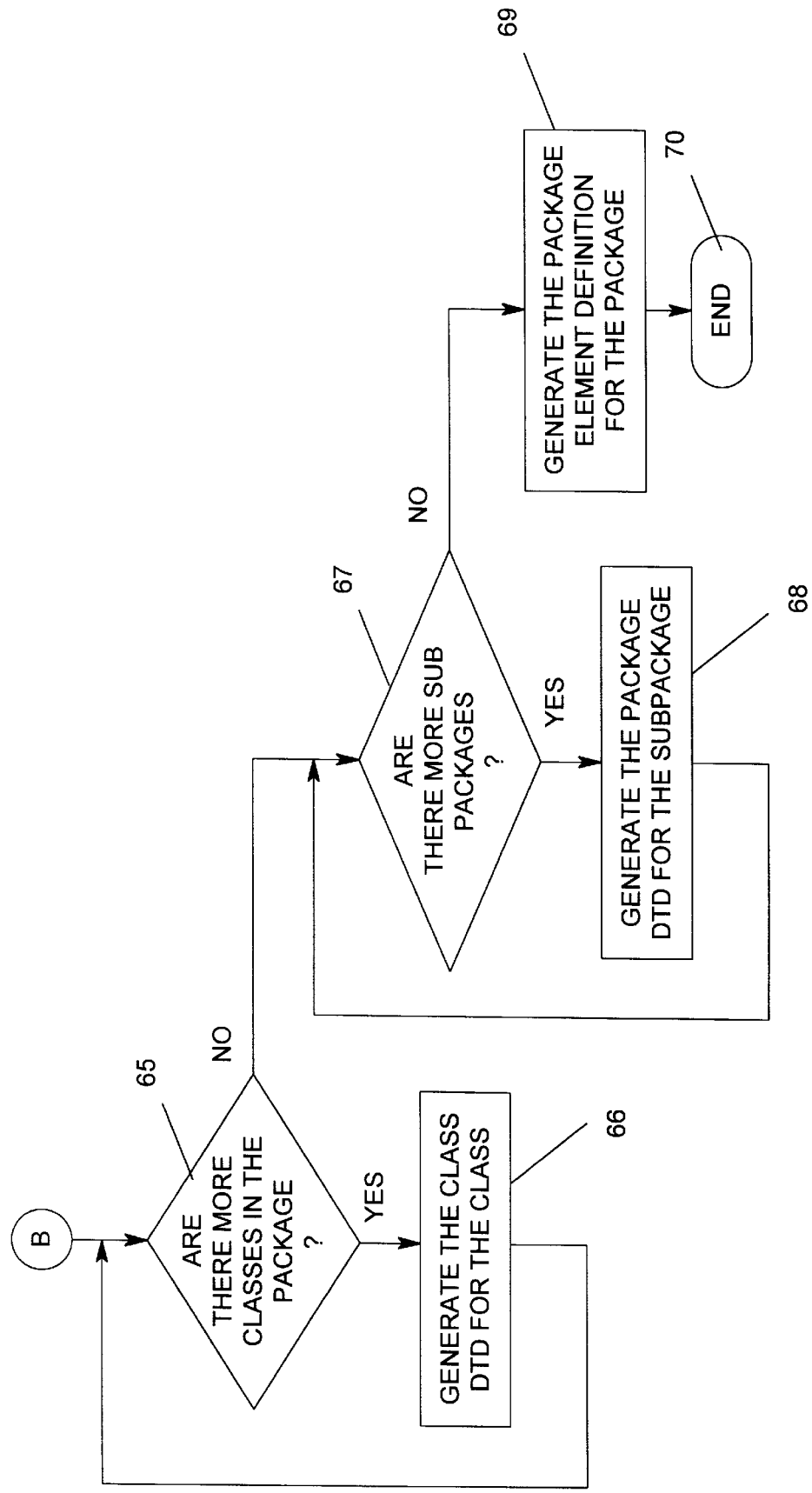

METHOD FOR GENERATING SIMPLE DOCUMENT TYPE DEFINITIONS

CROSS REFERENCE TO RELATED APPLICATIONS

This patent document relates to the following patent applications, assigned to the same assignee hereof, which are incorporated herein by reference.

U.S. Ser. No. 09/282,102, entitled A METHOD AND SYSTEM FOR GENERATING A COMPACT DOCUMENT TYPE DEFINITION FOR DATA INTERCHANGE AMONG SOFTWARE TOOLS; and, U.S. Ser. No. 09/282,230, entitled A METHOD AND SYSTEM FOR GENERATING A HIERARCHIAL DOCUMENT TYPE DEFINITION FOR DATA INTERCHANGE AMONG SOFTWARE TOOLS.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of object-oriented programming; and, in particular to a method and system for enabling easy interchange of metadata among repositories and modeling tools implementing instances of meta-models expressible in a meta object framework.

BACKGROUND OF THE INVENTION

Repositories provide a central place for recording metadata and enable one to store, manage, share and reuse information about data (i.e., metadata) that an enterprise uses. A repository can store definitional, management and operational information. Tools can be integrated with the repository to support information sharing and metadata reuse, and tool and technology models may be developed to manipulate the tool information in the repository. However, the transferring of data within models from tool to tool or from a tool to the repository has been a cumbersome and unyielding task for a long time.

Repository models typically contain classes, datatypes and messages. As more and more complex models are being built, the need arises for a method and system to transfer data in a model from place to place, e.g., to a tool that understands the UML ("Unified Modeling Language"). The present invention solves this problem by generating a data-transfer syntax in which a tool using a meta-model can transport data from place to place. It is pointed out that the present invention is not limited to UML, but is applicable to a wide variety of languages.

The prefix "meta" as used herein shall describe a relationship. For example, "meta-data" describes data. In a similar fashion, a meta-object is an object that represents "meta-data"; and, "meta-model" means a model that defines an abstract language for expressing other models. A "meta-metamodel" means a model that defines an abstract language for expressing meta-models. The relationship between a meta-metamodel and a meta-model is analogous to the relationship between a meta-model and a model.

It is a tedious and time consuming task to generate a format description for enabling the interchange of metadata among repositories and each different type of modeling tool available. Accordingly, there is a need for automatically generating format descriptions to expedite interchange of metadata among repositories and modeling tools. As will be described hereinbelow, this invention solves this problem by automating the production of an XML DTD for meta-models stored in a MOF-compliant repository by implementing instances of the meta-models expressible in a meta object framework.

SUMMARY OF THE INVENTION

It is an object of the present invention to provide a method for generating a data transfer syntax that enables ease of interchanging metadata between modeling tools and metadata repositories in distributed heterogeneous environments.

Another object of the present invention is to provide a method and system that allows developers of distributed systems the ability to share object models and other metadata over a network, including the Internet.

Yet another object of the present invention is to provide a method and system that allows data or metadata to be interchanged as streams or files with a standard format based on XML.

A feature of the present invention is the parsing of a metamodel to obtain the elements necessary to generate document type definitions for data interchange among software tools.

Another feature of the present invention is the grouping of common functionalities of different elements of the methods used to generate the document type definitions into auxiliary functions.

Yet another feature of the present invention is the handling of multiple inheritances of objects in the metamodel through recursive routines that use a list of previously visited objects.

An advantage of the present invention is the software language independence of the algorithm used to implement the method, making it flexible and portable.

Another advantage of the present invention is that the method and the algorithm used to generate document type definitions for meta-models is independent of the meta-model type thereby making it more adaptable and interoperable.

A method is disclosed for use in a software development framework that has a repository and at least two software systems. The repository contains a meta-model and the software systems store instances of the meta-model. The method enables exchange of the instances of the meta-model among the software systems using a generalized data transfer language. The method comprises the steps of extracting a fixed component and a variable component of the meta-model; parsing the variable component into constituent components; and, transforming each of the constituent components into corresponding components of a generalized software language. The previous two steps are repeated for each instance of the variable component. Next, each instance of the variable component is transformed into corresponding components of the generalized software language. The fixed components are then transformed into corresponding components of the generalized software language. After this, the corresponding components are distributed among the software systems, where they are used as the format specification for the generalized data transfer language transport of the instances of the meta-model among the software systems.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

FIGS. 3A, 3B and 3C illustrate a hierarchy of meta-syntactic variables in an XDL DTD generated by the method of the present invention.

FIGS. 5A, 5B and 5C combined form a flow chart of the package DTD generation process.

DETAILED DESCRIPTION OF ONE EMBODIMENT

Figure 1:
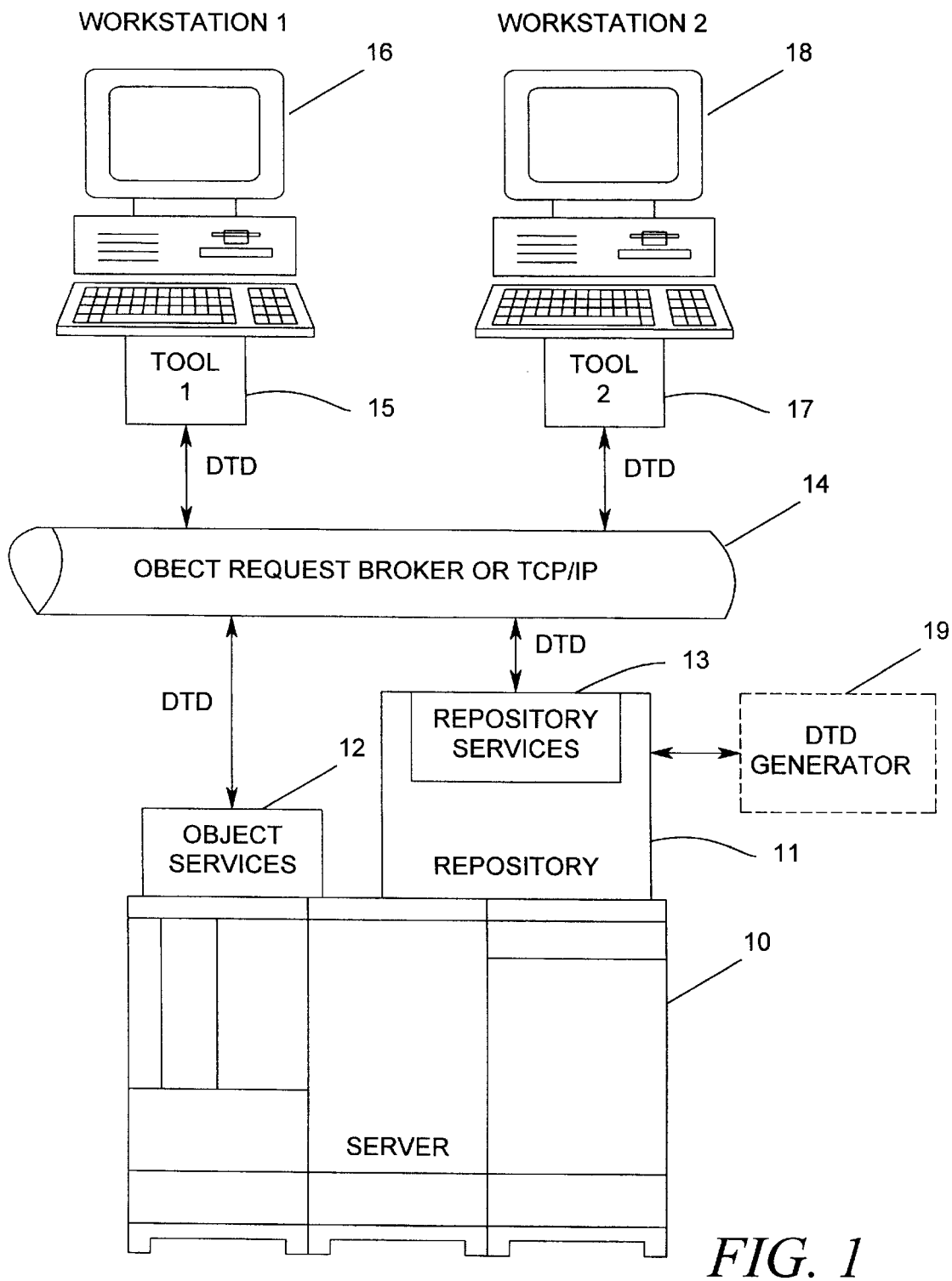
FIG. 1 is a block diagram of a system that may employ the method and system of the present invention.

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

Users of workgroup-based and component development tools are finding it increasingly difficult to coordinate their software development efforts across the enterprise. A solution in accordance with the present invention employs the benefits of XMI (XML Metadata Interchange), which is an open industry standard that combines the benefits of the Web-based XHL standard for defining, validating and sharing document formats on the Web with the Meta Object Framework (MOF) to provide a means for generating formats that allow the development tools to share information. One particular use of the present invention is to define an XML DTD for the object-oriented Unified Modeling Language (UML). The XMI specification provides application developers with a common language for specifying transfer syntax for development language that allows visualizing, constructing and documenting of distributed objects and business models. Each transfer syntax in XMI is defined by a Document Type Definition (DTD). The XMI specification in conjunction with the present invention will enable integration of development tools from multiple vendors, collaboration and distribution of object-oriented design and database schema information, and enhancement of the life cycle of information resources.

Software architectures based on meta-models are transforming how one can design an architecture for dynamic distributed systems. The UML and MOF specifications establish a robust meta-model architecture for distributed object applications. The XMI specification extends this architecture by leveraging technologies developed for the Web to exchange models between tools, applications and repositories.

In order to accomplish the objects of the present invention it is necessary to generate Document Type Definitions ("DTD") for the Extensible Markup Language ("XML"), a World Wide Web Consortium standard. A DTD is a set of rules governing the element types that are allowed within an XHL document, and rules specifying the allowed content and attributes of each element type. The DTD also declares all the external entities referenced within the document and the notations that can be used. Stated otherwise, an XML DTD provides a means by which an XML processor can validate the syntax and some of the semantics of an XHL document. An XMI DTD specifies the particular elements allowed in an XMI document.

The present invention describes algorithms for generating an XMI DTD for any valid meta-model defined in a MOF-compliant repository. Referring now to FIG. 1 a block diagram of the system that may employ the present invention is shown. A server 10 executes a variety of software including a repository 11 and object services 12. The repository 11 includes a set of repository services 13, which also couple the repository to an object request broker ("ORB") 14. The object services 12 also couples the server to the ORB 14. It is noted that a TCP/IP connection will suffice in lieu of the ORB 14. A first tool 15, which is being executed by a first workstation 16, is coupled to the ORB 14. In a similar manner, a second tool 17, which is being executed by a second workstation 18, is also coupled to the ORB 14. As will be explained in greater detail hereinbelow, the present invention includes a DTD generator 19, which effects data interchange among the tools 15 and 17 and the repository 11 by defining the contents of the messages exchanged. The DTD generator 19 is illustrated in dashed lines to denote the fact that it appears earlier in time than the actual data interchange. That is, the DTD is first generated then it is subsequently employed for communication by the repository 11 with the tools 15 and 17.

In the disclosed embodiment, the repository 11 is a specialized, extensible object-oriented database application that adds value to a database system, which allows customization of a particular domain (such as application development).

The repository 11 further includes methods for cataloging, browsing, modeling, and managing components that make up an application. Methods to support these services are disclosed in several patents and patent applications assigned to the assignee of this patent application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992 for A METHOD FOR MAPPING TYPES IN A MODEL IN A OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848,273 for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMING LANGUAGE; U. S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY; pending application Ser. No. 08/934,833, filed on Sep. 22, 1997, for TOOL-INDEPENDENT APPLICATION DEVELOPMENT; and, pending application Ser. No. 08/934,834, filed on Sep. 22, 1997, for EXCHANGING INFORMATION BETWEEN DIFFERENT OBJECT MODELS AND UML; each of which are hereby incorporated by reference as if set forth in full herein.

Figure 2:
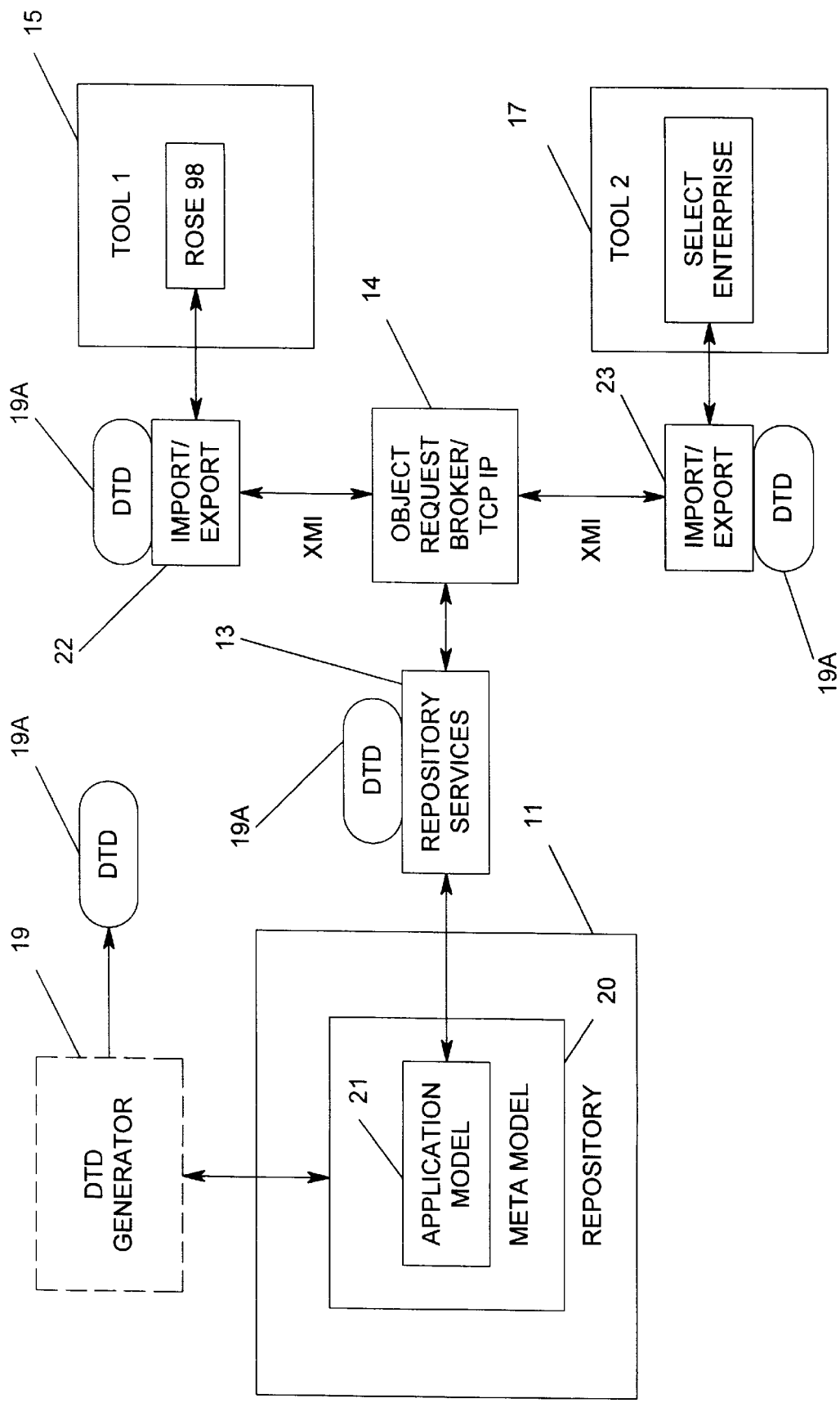
FIG. 2 is a software module block diagram of particular embodiment that may employ the method and system of the present invention.

Referring now to FIG. 2, a software module block diagram of a particular arrangement that may employ the method and system of the present invention is shown. The repository 11 contains within it a meta-model 20, which includes an application model 21 that is made available (via the repository services 13) to the ORB 14. The DTD generator 19 is disposed for generating the DTD and is again illustrated in dashed lines to denote the fact that it is occurs earlier in time. The application model 21 may for example comprise an accounting system; and, the meta-model 20 could be UML.

The ORB 14 is coupled to the tool 15 by means of an import/export module 22; and, in a like manner to the tool 17 by means of an import/export module 23. The term "import" as used herein shall mean the creation of an object based on a description of an object transmitted from an external entity. The term "export" as used herein shall mean the transmission of an object to an external entity. The application model 21 communicates with the ORB through the repository services 13.

In operation, the DTD generator 19 accesses the meta-model 20 and then produces the DTD (bubble 19A). Using the DTD thus created, the Repository Services 13 is able to generate an XMI data stream from the Application Model 21. This XMI data stream can thus be communicated through the ORB 14 to the input/export module 22 or 23. The DTD is then used by the module 22 or 23 to place the data from the Application Model 21 into the Tool 15 or the Tool 17.

Alternatively, the input/export module 22 or 23 can use the generated DTD to extract model information from the Tool 15 or the Tool 17, and to create an XMI data stream. This data stream can be communicated via the ORB 14 to the Repository Services 13, which can use the DTD to populate an application model such as the Model 21 in the Repository 11.

There are various methods by which the DTD generator 19 can produce the DTD. The method described herein produces a DTD by the simplest method allowed by the MOF meta-metamodel.

An XML DTD may define a "root element" in which all content is defined. The root element for an XMI DTD is the "XMI" element. The XMI DTD element produced by the method of the present invention comprises the meta-syntactic hierarchy illustrated in FIGS. 3A through 3C, and described hereinafter. The following convention is used in describing FIGS. 3A through 3C. A bubble represents a meta-syntactic variable of the DTD grammar being used by the method of this invention. It may be attached to other bubbles by one of three types of arrows. An arrow that points to the right indicates that the bubble to the left and the bubble to the right form a sequence. An arrow pointing from a bubble to itself indicates that the bubble may be repeated in a sequence. An arrow pointing downward indicates a syntactic resolution. That is, the item in the lower bubble refines the item in the upper bubble, or stated conversely, the upper bubble "produces" the lower bubble. When there is more than one downward pointing arrow, the bubbles so connected represent mutually-exclusive alternative resolutions of the upper bubble. In other words, the upper bubble produces exactly one of its possible alternatives.

Figure 3A:
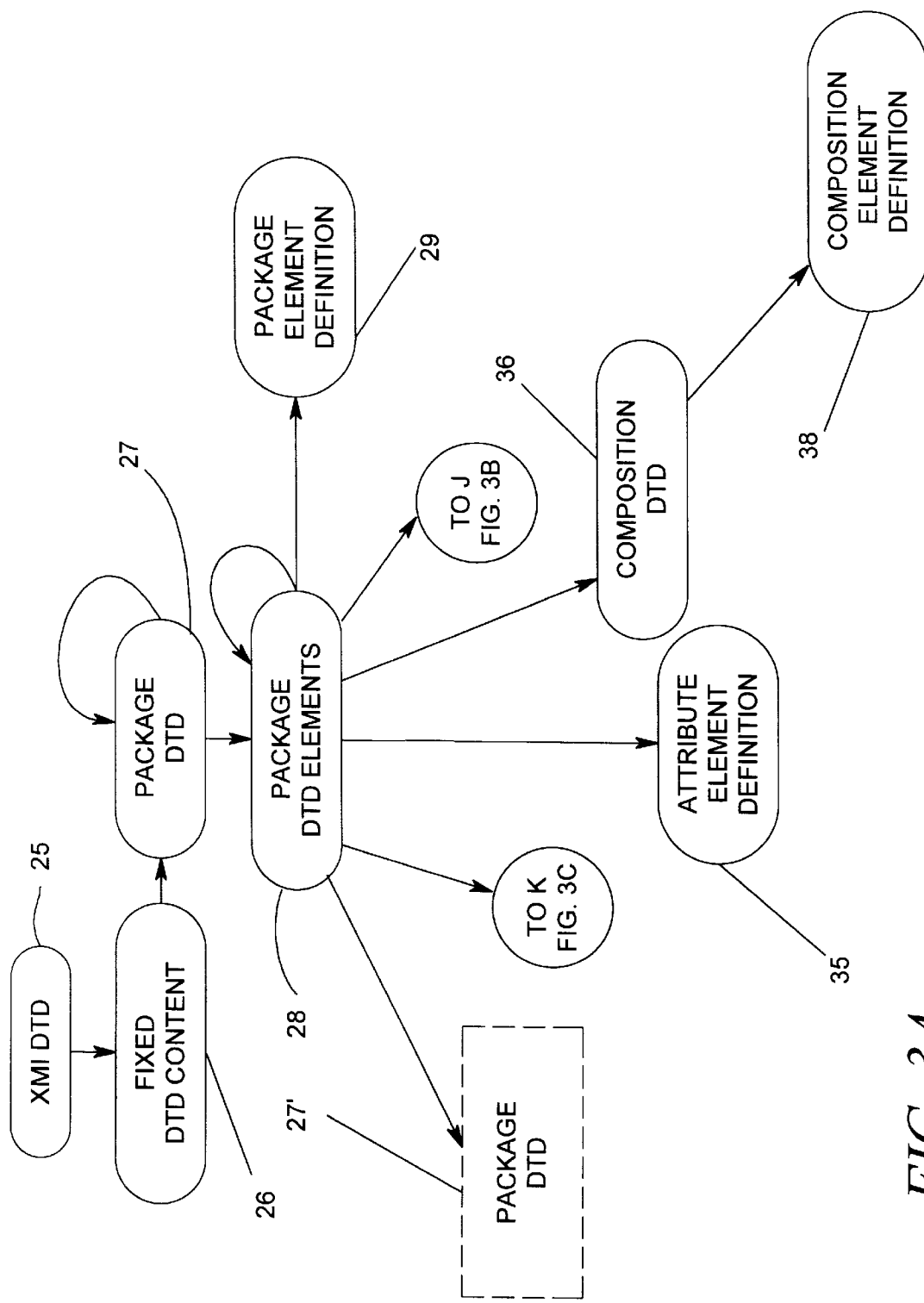

Referring now to FIG. 3A, the first of a three-part diagram illustrating the grammar used to produce the DTD by the method of this invention is shown. This diagram shows the hierarchy of meta-syntactic variables of which all XMI DTD's produced by the method of the present invention are syntactic instances. In the description that follows, the term "DTD" is used as an abbreviation of the proper term, which is "DTD fragment".

An XMI DTD 25 comprises a Fixed DTD content 26, followed by one or more Package DTD's 27 for the outermost MOF Packages in the meta-model 20. The Fixed Content 26 is a fixed string of text as defined in the OMG XHI Recommendation (XML Metadata Interchange (XbI4), OMG Document ad/98-10-05). A Package DTD 27 comprises the DTD fragments for the items in a MOF Package in the meta-model 20. Each Package DTD 27 comprises zero (in theory; in practice the value is one) or more Package DTD Elements 28, followed by a Package Element Definition 29.

The Package DTD Element 28 is either a Package DTD 27', an Attribute Element Definition 35, a Composition 36, a Class DTD 30 (FIG. 3B at a connector J) or an Association DTD 39 (FIG. 3C at a connector K). The Package DTD 27' is a recursive use of the Package DTD 27 defined above and need not be further discussed. A Composition DTD 36 comprises simply a Composition Element Definition 38. An Attribute Element Definition 35 produces the XHL element definition for a MOF Attribute of a MOF Class in the meta-model 20. A Composition Element Definition 38 produces the XML element definition for the MOF Classes that are owned by other MOF Classes in the meta-model 20. A Package Element Definition 29 produces the XML element definition for a MOF Package in the meta-model 20.

Referring now to FIG. 3B, the meta-syntactic hierarchy for the Class DTD 30 is shown. The Class DTD 30 comprises DTD fragments of the items in a MOF Class in the meta-model 20. Each Class DTD 30 includes zero (in theory; in practice the value is one) or more Class DTD Elements 31, followed by a Class Element Definition 32. The Class DTD Element 31 is either a Reference Element Definition 34 or an Attribute Element Definition 35', which is the same as the Attribute Element 35 defined above. A Reference Element Definition 34 produces the XML element definition for the MOF References made by a MOF Class in the meta-model 20;and, a Class Element Definition 32 produces the XML element definition for a MOF Class in the meta-model 20.

Referring now to FIG. 3C, the meta-syntactic hierarchy for the Association DTD 39 is shown. The Association DTD 39 includes the DTD fragments of an un-referenced Association in the meta-model 20. Each Association DTD 39 comprises two Association End Definitions 41 and 42, followed by the Association Definition 43. Each of the Association End Definitions 41 and 42 produces the XML element definition for an un-referenced MOF Association-End in the meta-model 20. The Association Definition 43 produces the XML element definition for an un-referenced Association in the meta-model 20.

In the descriptions of flow charts that follow, terms such as "Package", "Class", "Attribute", etc., are capitalized to indicate that they are specific types of meta-model objects.

Figure 4:
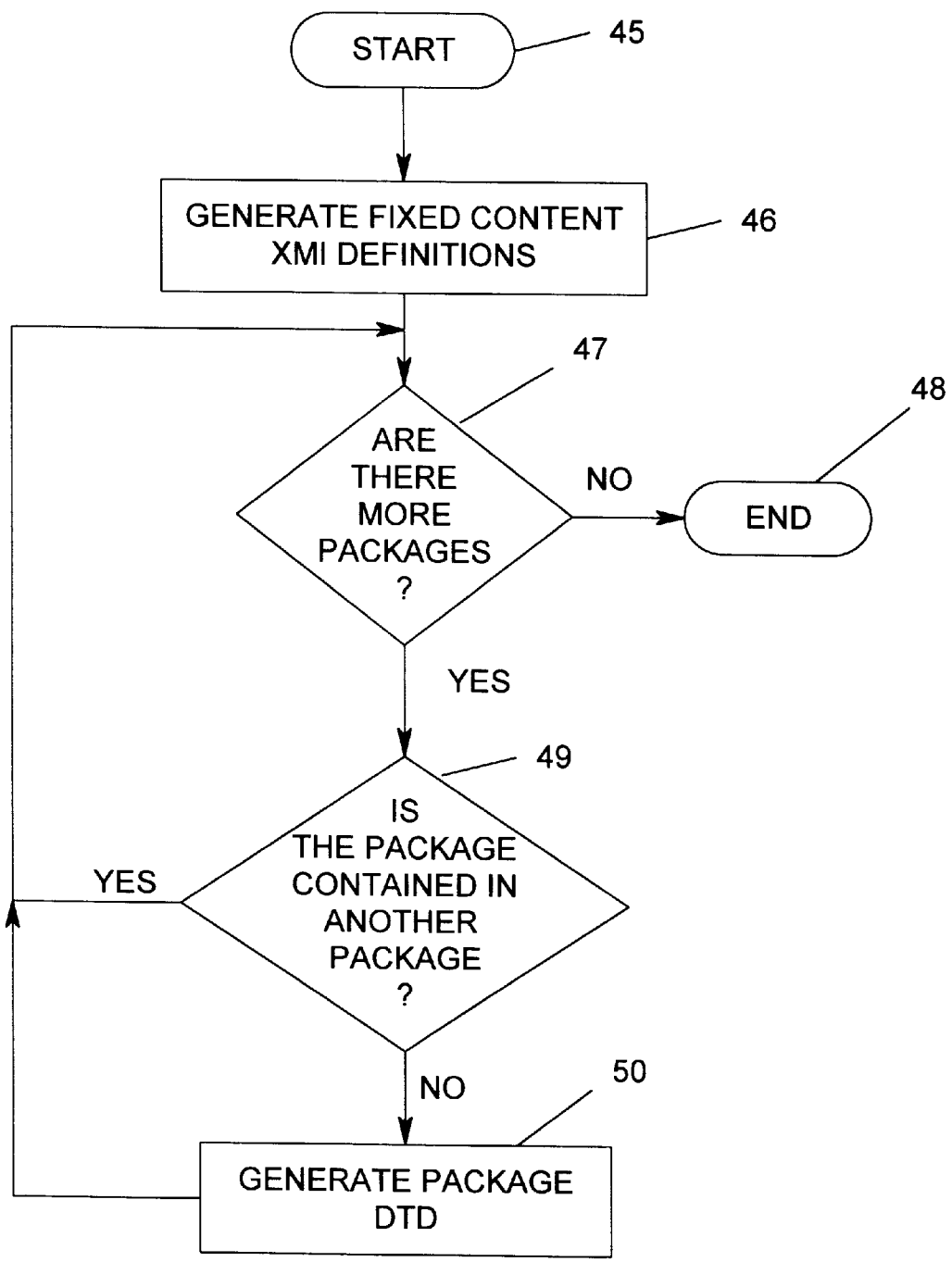
FIG. 4 is a flow chart of the DTD generation process.

Referring now to FIG. 4, a flow chart of the overall DTD generation process (i.e., details of the XMI DTD element 25) is shown. The process begins with a start bubble 45 followed by a step of generating fixed content XMI definitions (block 46). Next, an inquiry is made as not whether or not there are more Packages (diamond 47). If the answer to this inquiry is no then the process ends (bubble 48). On the other hand if the answer to this inquiry is yes, then another inquiry is made as to whether or not the Package is contained in another Package (diamond 49). If the answer to this second inquiry is yes, then a return is made back to the diamond 47 for processing the next Package. On the other hand, if the answer to this second inquiry is no, then a Package DTD 27 is generated (block 50) for the Package. After this, a return is made back to the diamond 47 for processing the next Package.

Figure 5A:
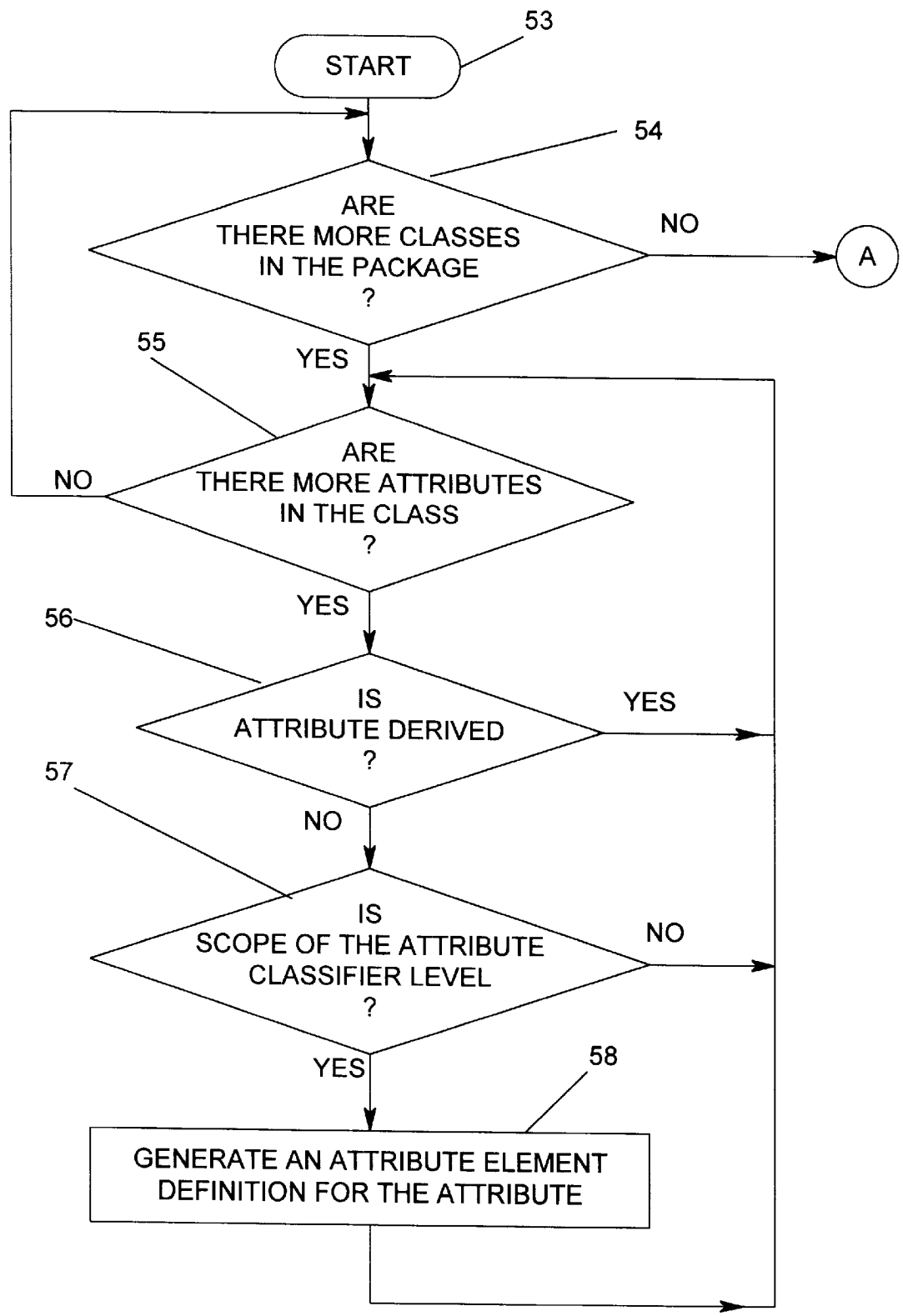
Figure 5B:
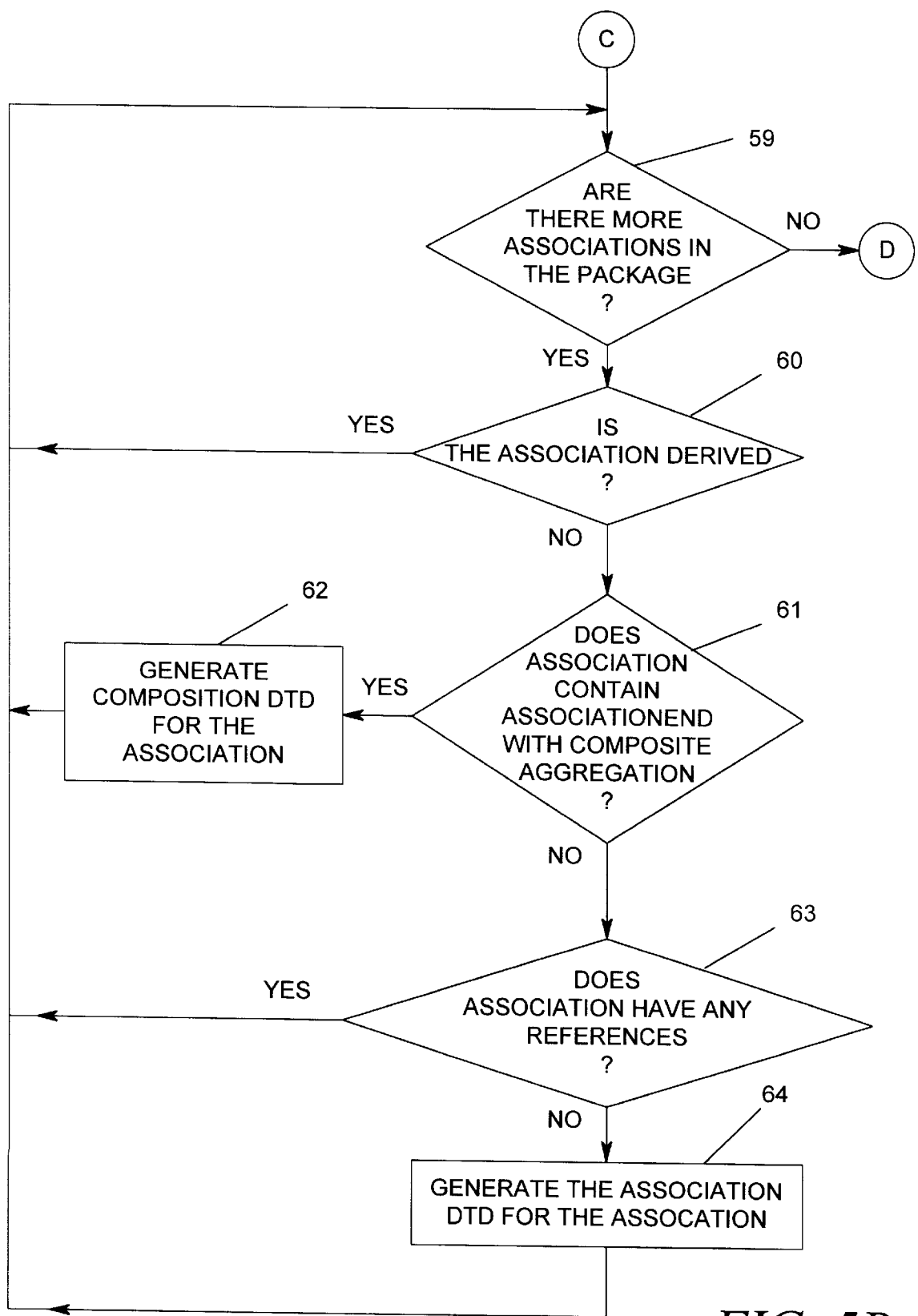

Referring now to FIGS. 5A, 5B and 5C, a flow chart of the Package DTD 27 or 27' generation process is shown. The process begins with a start bubble 53, followed by an inquiry as to whether or not there are more Classes in the Package (diamond 54). If the answer to this inquiry is no, then a branch is made to FIG. 5B, as denoted by a connector A. On the other hand, if the answer to this inquiry is yes, then another inquiry is made as to whether or not there are more Attributes in the Class (diamond 55). If the answer to this inquiry is no, then a return is made back to the diamond 54. On the other hand, if the answer to this inquiry is yes, then another inquiry is made as to whether or not the Attribute is derived (diamond 56). If the answer to this inquiry is yes, then a return is made back to the diamond 55 for processing the next Attribute. On the other hand, if the answer to this inquiry is no then another inquiry is made as to whether or not the scope of the Attribute is classifier level (diamond 57). If the answer to this inquiry is no, then a return is made back to the diamond 55 for processing the next Attribute. On the other hand if the answer to this inquiry is yes, then an Attribute Element Definition 35 for the Attribute is generated (block 58). Upon completion of the preceding step, a return is made back to the diamond 55 for processing the next Attribute.

Referring now to FIG. 5B at the connector A, an inquiry is made as to whether or not there are more Associations in the Package (diamond 59). If the answer to this inquiry is no, then a branch is made to FIG. 5C at a connector B. On the other hand, if the answer to this inquiry is yes, then another inquiry is made as to whether or not the Association is derived (diamond 60). If the answer to this inquiry is yes, then a branch is made back to the diamond 59 for processing the next Association in the Package. On the other hand, if the answer to this inquiry is no, then another inquiry is made as to whether or not the Association contains an Association-End with composite aggregation (diamond 61). If the answer to this inquiry is yes, then a Composition DTD 36 is generated for the Association (block 62). After this step a branch is made back to the diamond 59 for processing the next Association in the Package.

If the answer to the inquiry in the diamond 61 is no, then yet another inquiry is made as to whether or not the Association has any References (diamond 63). If the answer to this inquiry is yes, then a branch is made back to the diamond 59 for processing the next Association in the Package. On the other hand, if the answer to this inquiry is no, then the Association DTD 39 is generated for the Association (block 64). Upon completion of this step, a branch is made back to the diamond 59 for processing the next Association in the Package.

Referring now to FIG. 5C at the connector B, an inquiry is made as to whether or not there are more Classes in the Package (diamond 65). If the answer to this inquiry is yes, then the Class DTD 30 for the Class is generated (block 66). After this, a return is made back to the diamond 65 for processing the next Class in the Package. On the other hand, if the answer to the inquiry in the diamond 65 is no, then another inquiry is made as to whether or not there are more sub-Packages of the Package (diamond 67). If the answer to this inquiry is yes, then the Package DTD 27' for the sub-Package is generated (block 68). On the other hand, if the answer to this inquiry is no, then the Package Element Definition 29 for the Package is generated (block 69) and the process ends (bubble 70).

Figure 6A:
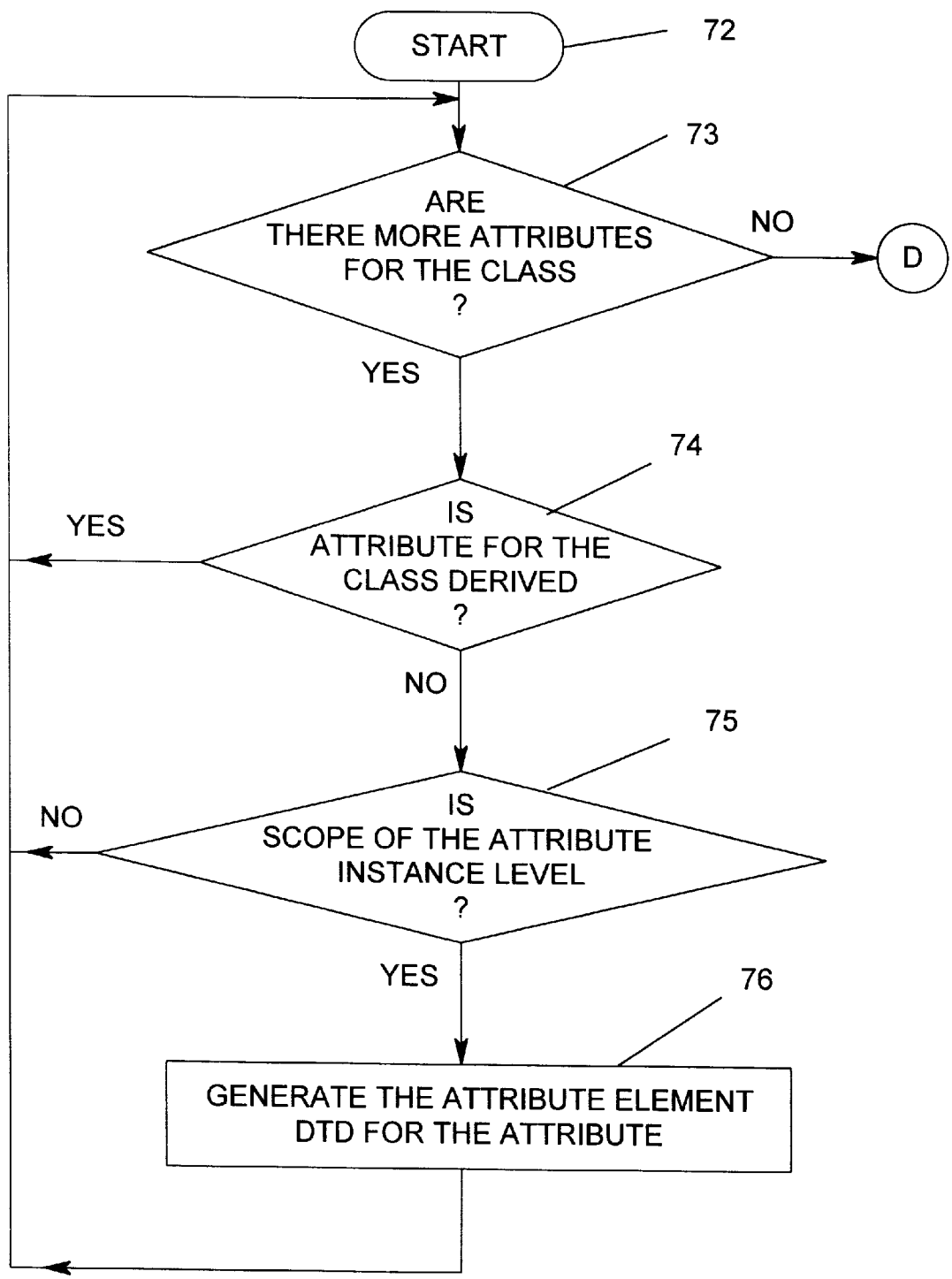
FIGS. 6A and 6B combined form a flow chart of the class DTD generation process.
Figure 6B:
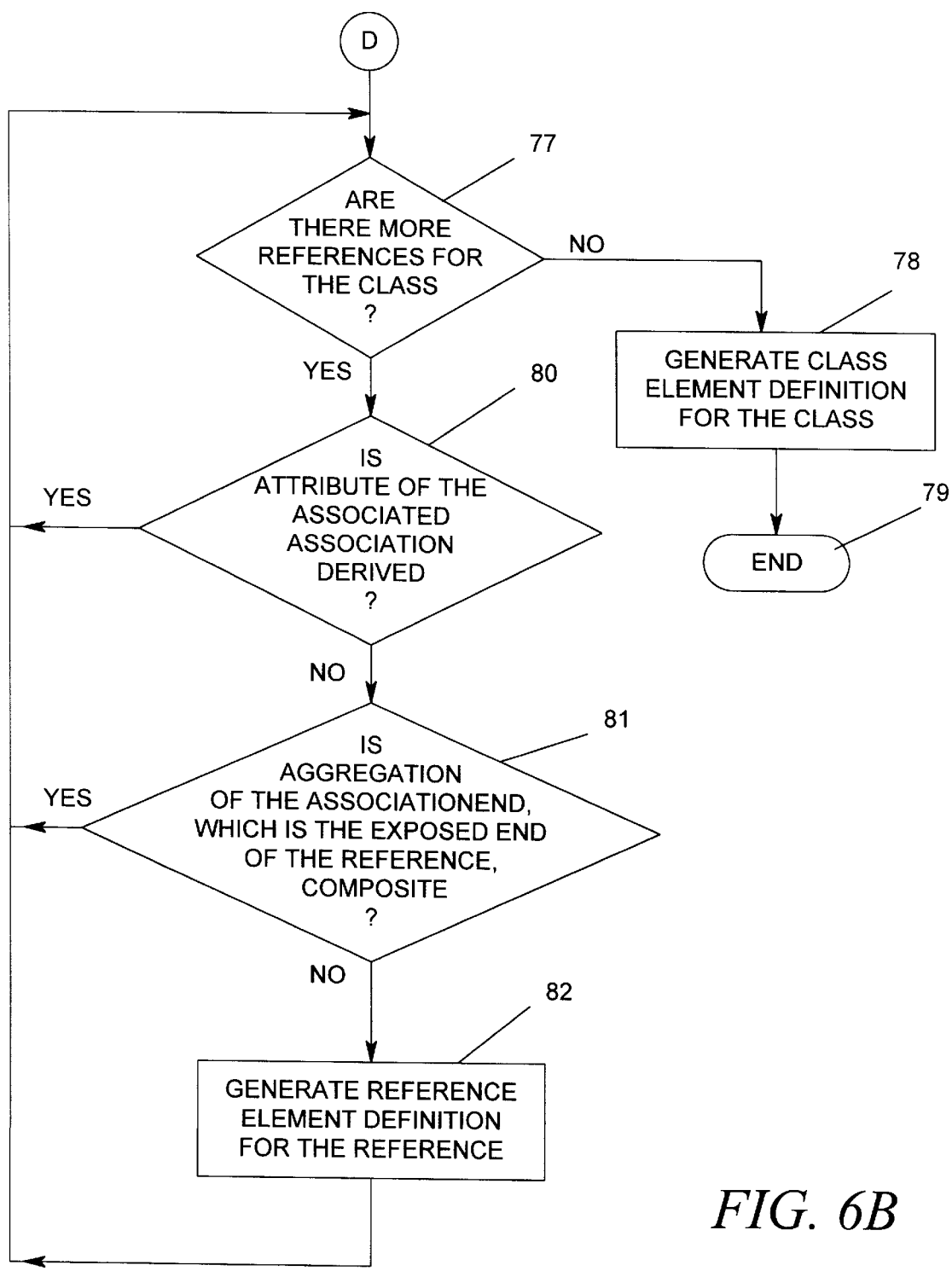

Referring now to FIGS. 6A and 6B, a flow chart of the Class DTD 30 generation process is illustrated. The process begins with a start bubble 72 followed by an inquiry as to whether or not there are more Attributes for the Class (diamond 73). If the answer to this inquiry is no, then a branch is made to FIG. 6B as denoted by a connector D. On the other hand, if the answer to this inquiry is yes, then another inquiry is made as to whether or not the Attribute is derived (diamond 74). If the answer to this inquiry is yes, then a return is made back to the diamond 73 to process the next Attribute. On the other hand, if the answer to this inquiry is no, then another inquiry is made as to whether or not the scope of the Attribute is instance level (diamond 75). If the answer to this inquiry is no then a return is made back to the diamond 73 to process the next Attribute. On the other hand, if the answer to this inquiry is yes, then the Attribute Element Definition 35 for the Attribute is generated (block 76). Next, upon completion of the preceding step, a return is made back to the diamond 73 for processing the next Attribute.

Referring now to FIG. 6B at the connector D, an inquiry is made as to whether or not there are more References for the Class (diamond 77). If the answer to this inquiry is no, then the Class Element Definition 32 is generated for the Class (block 78) and the process ends (bubble 79). On the other hand, if the answer to this inquiry is yes, then another inquiry is made as to whether or not the associated Association is derived (diamond 80). If the answer to this inquiry is yes, then a return is made back to the diamond 77 for processing the next Reference for the Class.

If the associated Association is not derived, then yet another inquiry is made as to whether or not the aggregation of the AssociationEnd that is the exposed end of the Reference is composite (diamond 81). If the answer to this inquiry is yes, then a return is made back to the diamond 77 for processing the next Reference for the Class. On the other hand, if the answer to this inquiry is no, then the Reference Element Definition 34 for the Reference is generated (block 82). After this step a return is made back to the diamond 77 for processing the next Reference for the Class.

Figure 7:
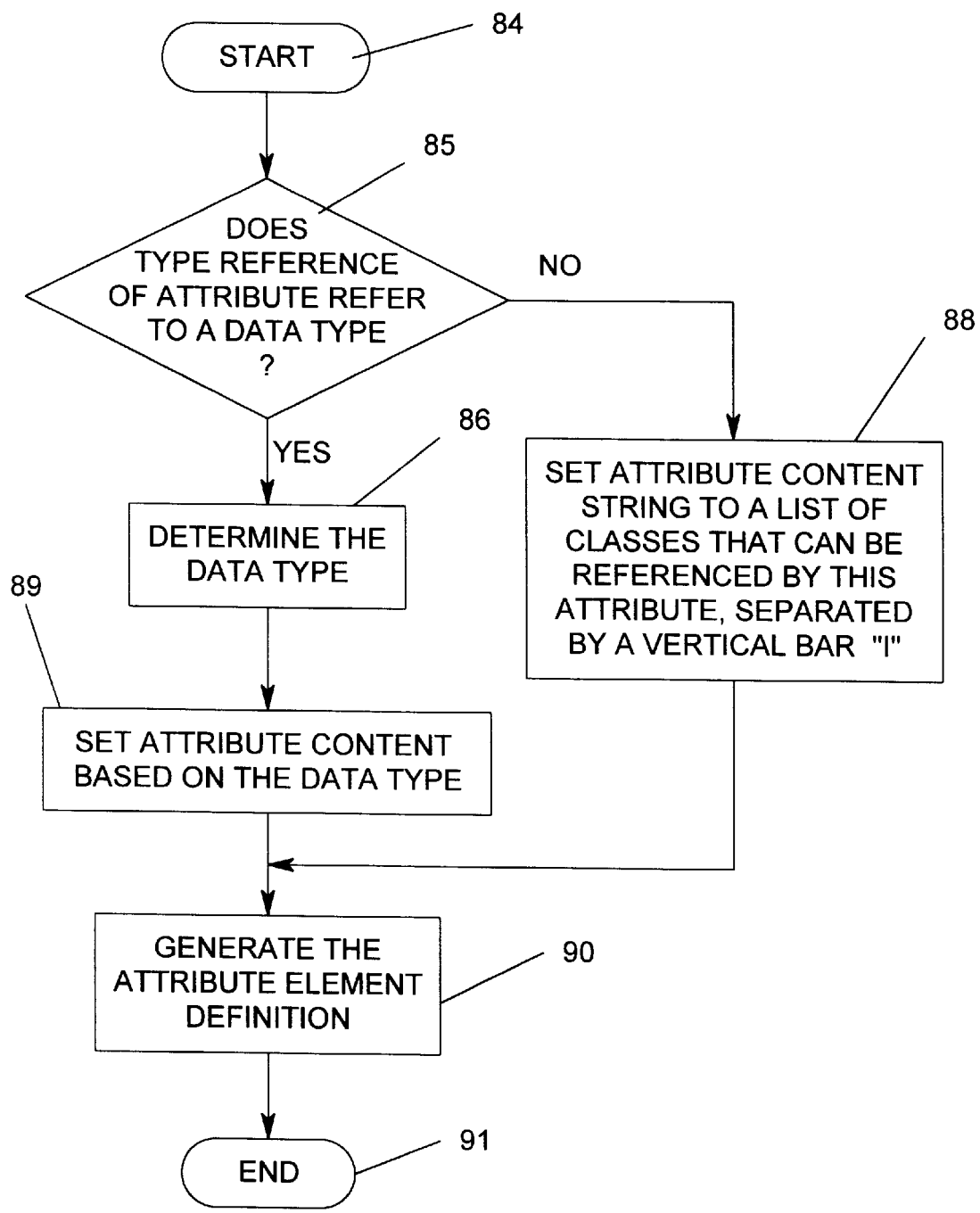
FIG. 7 is a flow chart of the Attribute Element Definition process.

Referring now to FIG. 7, a flow chart of the Attribute Element Definition 35 process is shown. The process begins with a start bubble 84 followed by an inquiry as to whether or not the type reference of the Attribute refers to a data type (diamond 85). If the answer to this inquiry is yes, then the data type is determined (block 86). On the other hand, if the answer to the inquiry in the diamond 85 is no, then an Attribute content string is set to a list of Classes that can be referenced by this Attribute, separated by vertical bars "|" to indicate that only one is chosen for use (block 88). After completion of the step depicted by the block 86, the Attribute content is set based on the data type (block 89). Upon completion of this last step, or completion of the step depicted by the block 88, the XML element definition for the Attribute is generated (block 90) and the process ends (bubble 91).

Figure 8A:
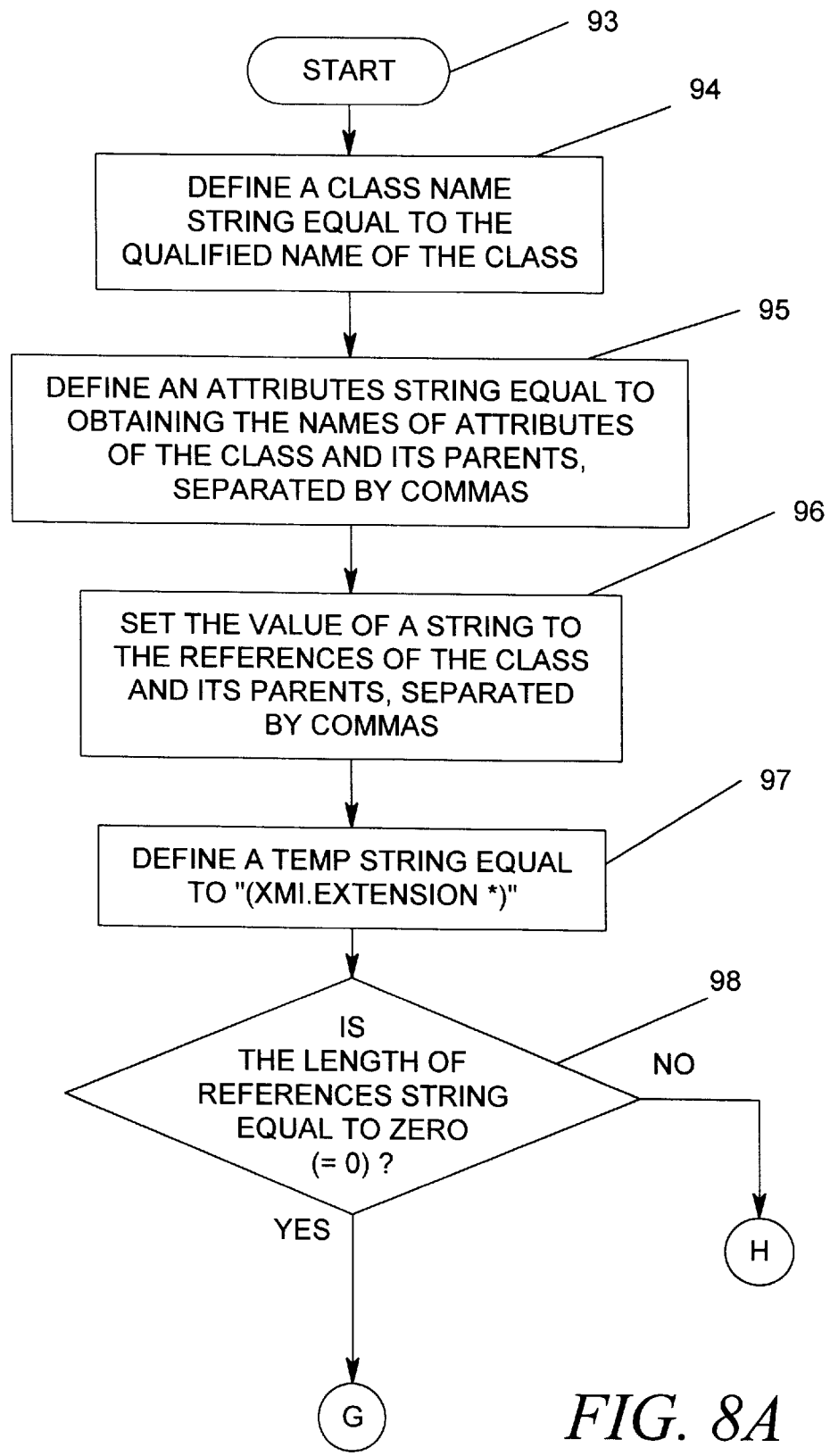
FIGS. 8A through 8C combined form a flow chart illustrating the Class Element Definition process.

Referring now to FIG. 8A, the first of a three-sheet drawing of the flow chart for the Class Element Definition 32 process is shown. The process begins with a start bubble 93 followed by a step of defining a class name string equal to the qualified name of the Class (block 94). Next, an attributes string is defined equal to obtaining the names of Attributes of the Class and its parent Classes, separated by commas to indicate that all must be present (block 95). After this, the value of a references string is defined containing the References of the Class and its parents, separated by commas (block 96). A Temp string is then defined equal to "(" & "XMI.extension" & "*" & ")" (where "&" indicates string concatenation) (block 97).

Figure 8B:
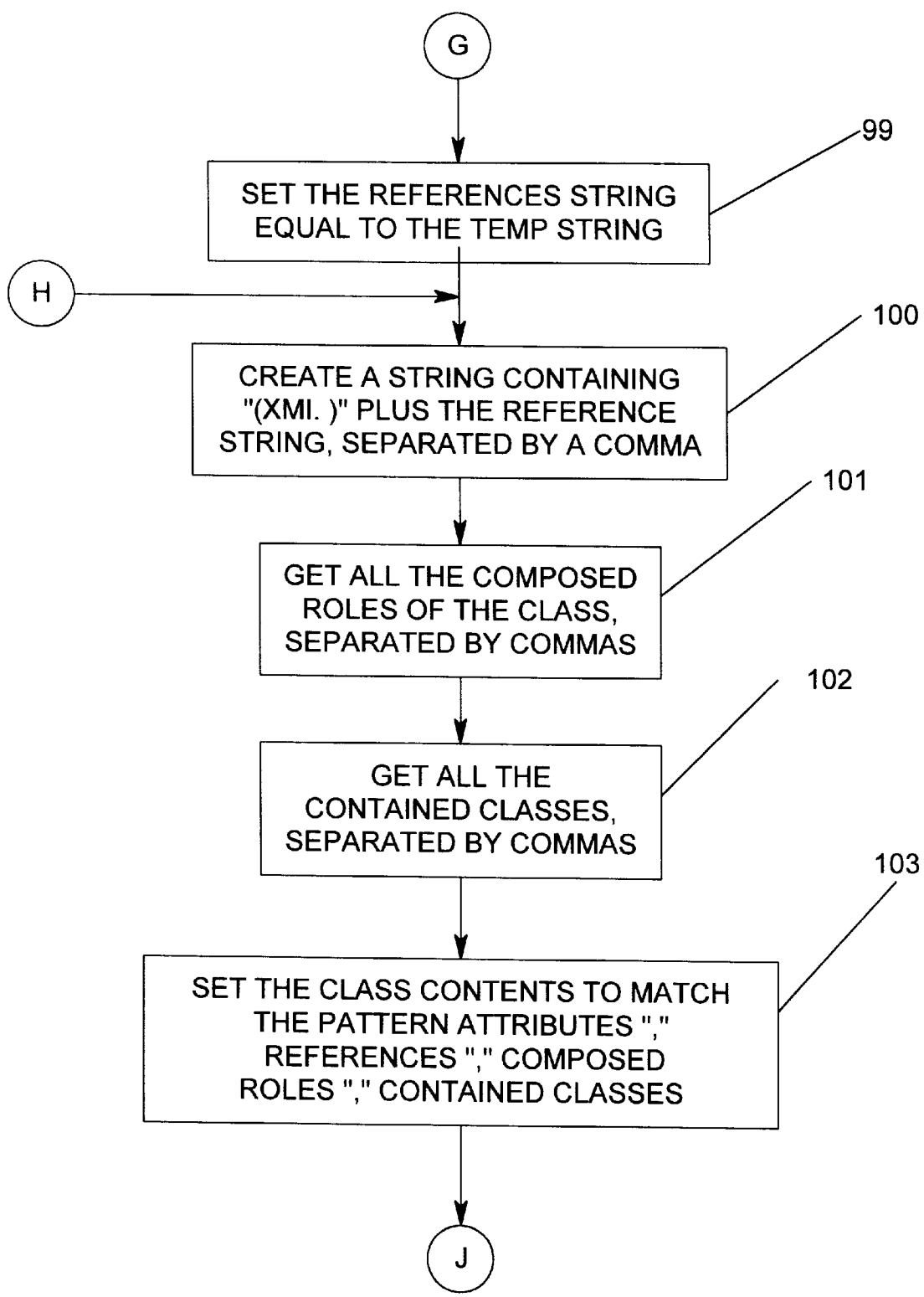

An inquiry is next made as to whether or not the length of the references string is equal to zero (diamond 98). If the answer to this inquiry is yes, then the process illustration continues in FIG. 5B at a connector G. On the other hand, if the answer to this inquiry is no, then the process illustration continues in FIG. 8B at a connector H.

Referring now to FIG. BE at the connector G, the references string is set equal to the Temp string (block 99). Following the connector H, a comma (",") and the references string are inserted into the Temp string, after the "*" and the result is assigned to the references string (block 100). After either block 99 or 100, all the composed roles of the class are obtained and placed in the composed roles string, separated by commas (block 101), and all the contained Classes are obtained and placed in the contained classes string, separated by commas (block 102). The class contents string is then defined to match the pattern: attributes string "," references string "," composed roles string "," contained classes string (block 103). Some of these strings might be empty, resulting in empty terms in the class contents string. The process illustration continues in FIG. 8C at a connector J.

Figure 8C:
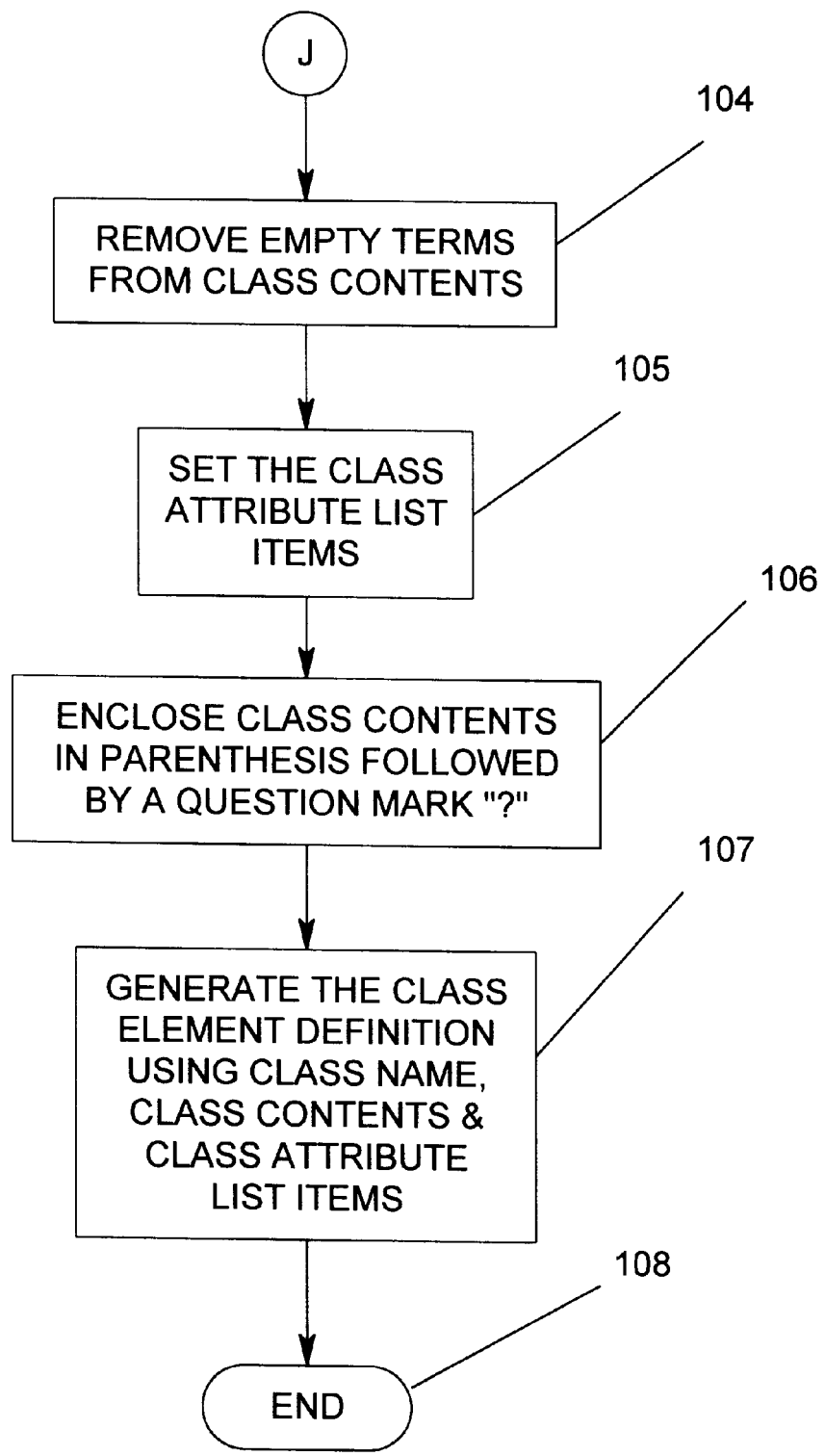

Referring now to FIG. 8C at the connector J, any empty terms are removed from the class contents string (block 104) and the Class attribute list items are set (block 105). After this, the class contents string is enclosed in parentheses followed by a question mark ("?") (block 106). Next, the Class XML element definition is generated using the class name, class contents and class attribute list items (block 107) and the process ends (bubble 108).

Figure 9:
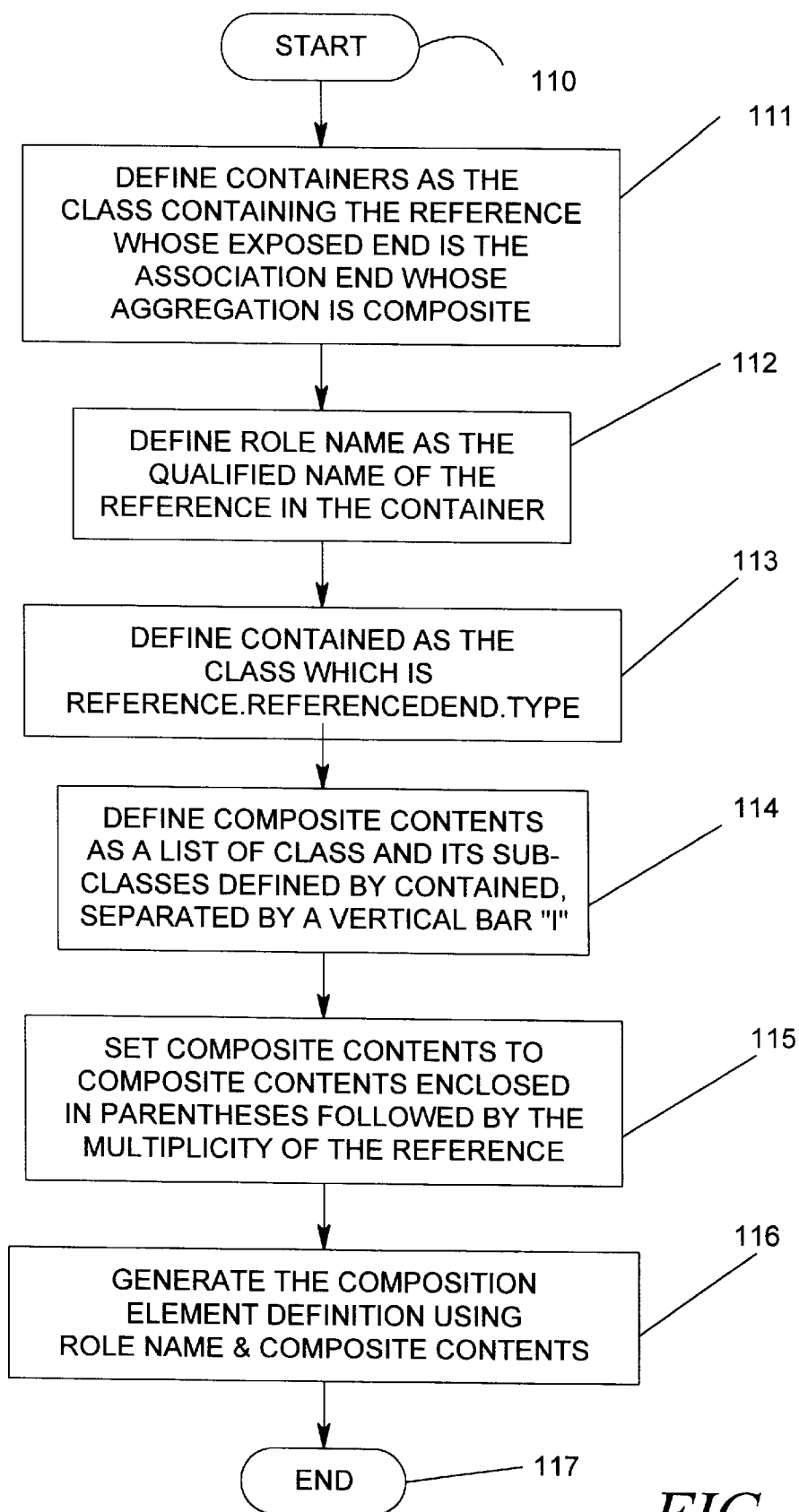
FIG. 9 is a flow chart illustrating the Composition Element Definition process.

Referring now to FIG. 9, a flow chart of the Composition Element Definition 38 is shown. The process begins with a start bubble 110 followed by a step of defining a variable, container, as the Class containing the Reference whose exposed end is the AssociationEnd whose aggregation is composite (block 111). Next, the role name is defined as the qualified name of the Reference in container (block 112) and the variable, contained, is defined as the Class which is the type of the referenced End of the Reference (block 113). After this, the composite contents is defined as a list of the Class and its sub-Classes as defined by contained, and separated by vertical bars "|" to indicate that only one is used (block 114). After this, the composite contents is set to composite contents enclosed in parentheses followed by the multiplicity of the Reference (block 115), and then the composition XML element definition is generated using role name and composite contents (block 116) and the process ends (bubble 117).

Figure 10A:
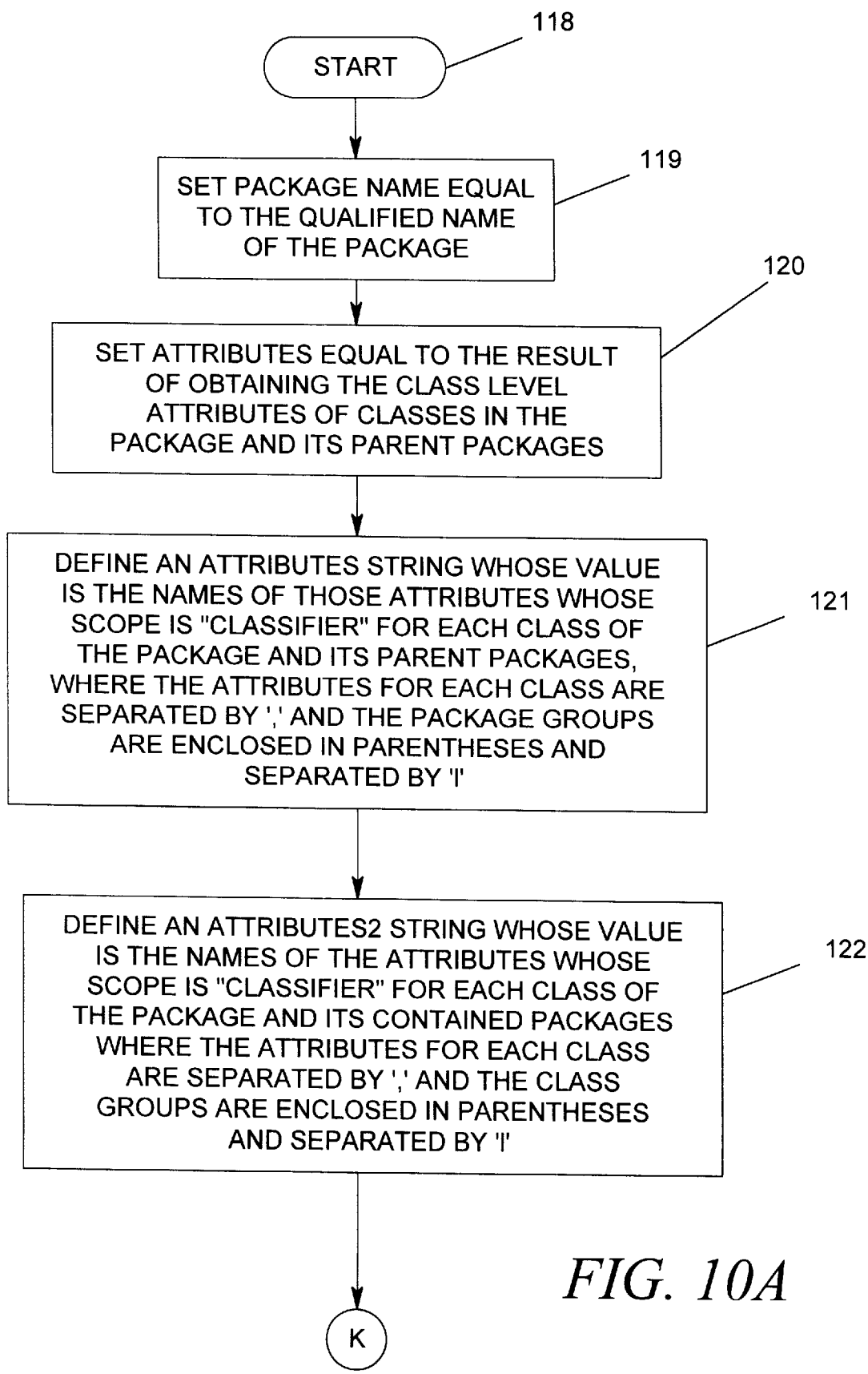
FIGS. 10A through 10C combined form a flow chart of the Package Element Definition process.

Referring now to FIG. 10A, the first of a three-sheet flow chart of the details of the Package Element Definition 29 is shown. The process begins with a start bubble 118 followed by a step of setting the package name string equal to the qualified name of the Package (block 119). After this, an attributes string is defined whose value is the names of those Attributes whose scope is classifier level for each Class of the Package and its parent Packages, where the Attributes for each Class are separated by commas (",") and the Class groups are enclosed in parentheses and separated by a vertical bar() "," (block 121). An attributes2 string is defined whose value is the names of the Attributes whose scope is classifier level for each Class of its contained Packages, where the Attributes for each Class are separated by "," and the Class groups are enclosed in parentheses and separated by a vertical bar "|" (block 122). The process illustration continues in FIG. 10B as denoted by a connector K.

Figure 10B:
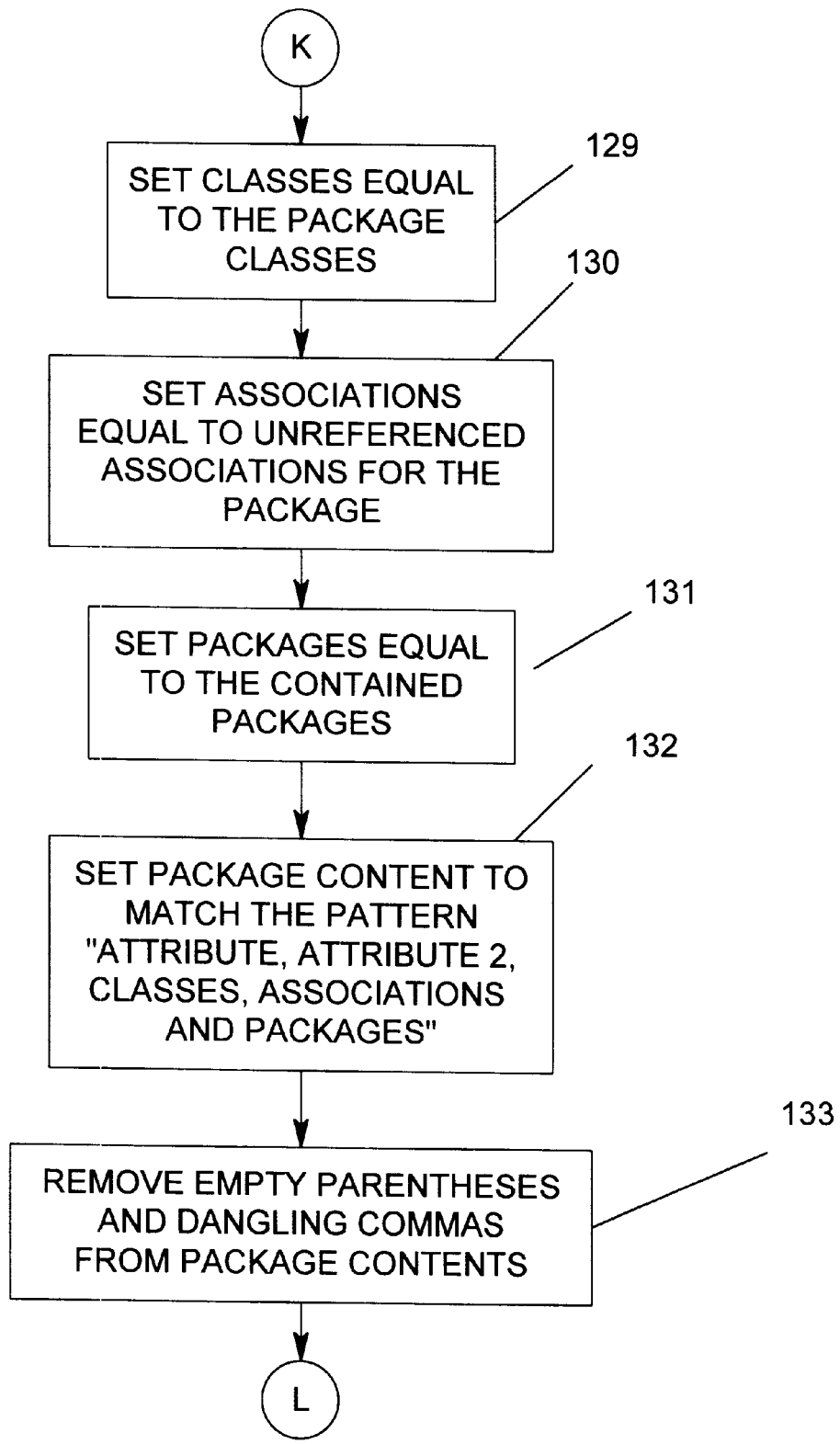

Referring now to FIG. 10B at the connector K, a classes string is set equal to the Classes of the Package (block 129) and an associations string is set equal to the unreferenced Associations of the Package (block 130). Next, a packages string is set equal to the contained Packages of the Package (block 131). After this, the package content string is set to match the pattern: "(" attributes string ")" "," "(" Attributes2 string ")" "," "(" classes string "|" associations string "|" packages string ")" (block 132). Some of these strings might be empty, resulting in empty parentheses or dangling commas. Any empty parentheses and dangling commas are next removed from the package contents (block 133). The process illustration continues in FIG. 10C at a connector L.

Figure 10C:
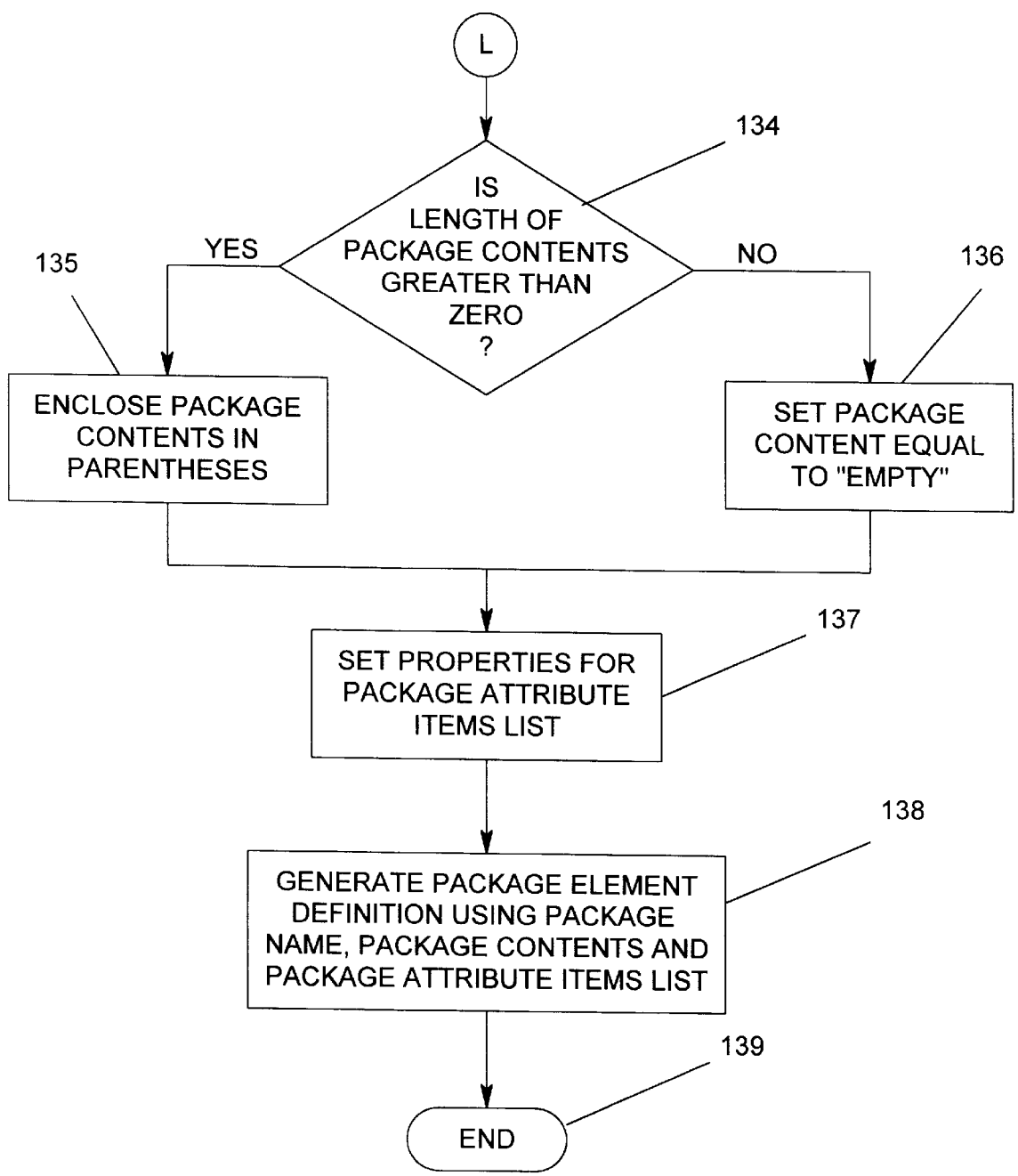

Referring now to FIG. 10C at the connector L, an inquiry is made as to whether or not the length of the package contents string is greater than zero (diamond 134). If the answer to this inquiry is yes, then the package contents are enclosed in parentheses (block 135). On the other hand, if the answer to this inquiry is no, then the package content is set equal to "EMPTY" (block 136). Upon completion of either of the steps depicted by the block 135 or 136, the properties for the package attribute items list are set (block 137). After this, the Package XML element definition is generated using package name, package contents and package attribute items list (block 138), and the process ends (bubble 139).

Auxiliary functions are required for several purposes, among which are the recursive procedures to manage inheritance and for XML details. The code for implementing the auxiliary functions is set forth in Exhibit A hereof.

These functions illustrate possible methods to perform the textual manipulations necessary to insure that the formatting of the XML definitions is correct. They also illustrate possible methods to obtain lists of Attributes, Classes, etc., where Class or Package inheritance is involved. While these functions can be used to perform the indicated operation, they are not necessarily the only means of so doing.

The GetAllInstanceAttributes function takes a Class and a list of the names of previously-visited Classes as parameters and is used to produce a list of all the Attributes of the Class, including those it inherits from its parent Class(es). It returns an empty string if the name of the Class parameter appears in the list of previously-visited Class names. Otherwise, it calls itself recursively for each of its immediate parent Classes, passing the parent Class and the previously-visited Class name list as parameters, inserting commas (",") between the non-empty results of the calls. It then calls the GetAttributes function, passing the parameter Class and a flag indicating that instance level Attributes are requested and appends the result of this call to the string produced by the call to obtain the parent Attributes, separated by a comma. It then adds the name of the parameter Class to the list of previously visited Class names and returns the list of Attribute names.

The GetAttributes auxiliary function takes a Class as a parameter and returns a list of the non-derived Attributes of the Class, if any, with the multiplicity of each Attribute relative to the Class reflected by the proper XML multiplicity specifier. Either the classifier level Attributes of the Class or its instance level Attributes may be thus obtained.

The GetAllReferences function takes a Class and a list of the names of previously-visited Classes as parameters and is used to produce a list of all the non-composed References of the Class, including those it inherits from its parent Class (es). It returns an empty string if the name of the Class parameter appears in the list of previously-visited Class names. Otherwise, it calls itself recursively for each of its immediate parent Classes, passing the parent Class and the previously-visited Class name list as parameters, inserting commas (",") between the non-empty results of the calls. It then calls the GetReferences function, passing the Class parameter and appends the result of this call to the string produced by the call to obtain the parent non-composed References, separated by a comma. It then adds the name of the parameter Class to the list of previously visited Class names and returns the list of non-composed Reference names.

The GetReferences auxiliary function takes a Class as a parameter and returns a list References, if any, of the Class the aggregation of whose exposed End is not composite, separated by commas, with the multiplicity of each Reference relative to the Class reflected by the proper XML multiplicity specifier.

The GetReferenceMultiplicity auxiliary function takes a Reference as a parameter and returns the proper XML multiplicity specifier for the Reference.

The GetContainedClasses auxiliary function takes two parameters, a Class and a list of the names of previously visited Classes. It recursively calls itself to get the Classes contained in all parent Class(es) of the parameter Class, using the previous Classes list to avoid visiting the same parent Class more than once. It then appends to this list the names of the Classes contained within the parameter Class itself. It encloses the result in parentheses ("( )") and appends an XML multiplicity of "*".

The GetAllComposedRoles function takes a Class and a list of the names of previously-visited Classes as parameters and is used to produce a list of all the composed References of the Class, including those it inherits from its parent class (es). It returns an empty string if the name of the Class parameter appears in the list of previously-visited Class names. Otherwise, it calls itself recursively for each of its immediate parent Classes, passing the parent Class and the previously-visited Class name list as parameters , inserting commas (",") between the non-empty results of the calls. It then calls the GetComposedRoles function, passing the Class parameter and appends the result of this call to the string produced by the call to obtain the parent composed References, separated by a comma. It then adds the name of the parameter Class to the list of previously visited Class names and returns the list of composed Reference names.

The GetComposedRoles auxiliary function takes a Class as a parameter and returns a list References, if any, of the Class the aggregation of whose exposed End is composite, with the multiplicity of each Reference relative to the Class reflected by the proper XML multiplicity specifier.

The GetClasses auxiliary function takes two parameters, Class and a list of the names of previously-visited classes, and is used whenever it is necessary to list all of the possible Classes to which an operation should apply. It puts the name of the parameter Class into the result and then calls itself recursively to append the Class names of each sub-Class, if any, of the parameter Class, using the previous classes list to avoid visiting the same sub-Class more than once. It separates the names of the Classes with the XML alternative indication, the vertical bar ("|").

The GetClassLevelAttributes auxiliary function takes a Package as a parameter and is used to obtain a list of all classifier level Attributes of all Classes, which might appear in the Package. It calls itself recursively to obtain the classifier level Attributes of its parent Package(s), if any. It then calls the GetAttributes function for each Class of the parameter Package to obtain the list of classifier Attributes of said Class and combines this list with the list of those from the parent Packages.

The GetNestedClassLevelAttributes auxiliary function takes a Package as a parameter and is used to obtain a list of all classifier level Attributes of all Classes which might appear in the Package or in any Package nested within it. It creates the list of the classifier level Attributes of the Classes of the parameter Package itself and then calls itself recursively to obtain this information for the Packages nested within it.

The GetPackageClasses auxiliary function takes a Package as a parameter and is used to obtain a list of the names of all of the Classes in the parameter Package and all of the Packages from which it is derived, or in which it is contained. It calls itself recursively to obtain the package Classes for its parent or containing Packages and then appends to this list the names of the Classes in the parameter Package itself.

The GetContainedPackages auxiliary function takes a Package as a parameter and is used to obtain a list of the names of the Packages contained in the parameter Package and its parent Packages. It calls itself recursively to obtain this information for its parent Packages and then appends the names of the Packages that it contains.

The GetUnreferencedAssociations auxiliary function takes a Package as a parameter and is used to obtain a list of the names of the unreferenced Associations, if any, of the parameter Package and its parent Packages. An unreferenced Association is one in which neither of the AssociationEnds of the Association is referred to by a Reference. This function calls itself recursively to obtain this information for its parent Packages and then appends the names of the unreferenced Associations of the parameter Package itself.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

```
GetAllInstanceAttributes
Function GetAllInstanceAttributes(in cls : Class,
                inout previousCls : String) Returns String
    If cls appears in previousCls, return the empty string
    Set parentAtts :=''
    For each parent Class of cls Do
        Set temp := GetAllInstanceAttributes(parent Class, previousCls)
        If Length(parentAtts)>0 and Length(temp)>0 Then
            Set parentAtts := parentAtts +','
        End
        Set parentAtts := parentAtts + temp
    End
    Set atts := GetAttributes(cls, 'instance')
    If Length(parentAtts)>0 and Length(atts)>0) Then
        Set parentAtts := parentAtts +','
    End
    Add cls to previousCls
    Return parentAtts + atts
End
GetAttributes
Function GetAttributes(in Cls : Class, in type: String) Returns String
    Set rslt :=''
    For each Attribute of cls, in the order specified by the MOF definition of the Class Do
        If isDerived is false Then
            If (type = 'instance' And scope is instanceLevel) Or
                (type = 'classifier' And scope is classifierLevel) Then
                Set name := Qualified name of the Attribute
                If the multiplicity of the Attribute is "1..*" Then
                    Set m := '+'(or '*' for a relaxed DTD)
                Else If the multiplicity of the Attribute is "0..1" Then
                    Set m := '?'
                Else If the multiplicity of the Attribute is not "1..1" Then
                    Set m := '*'
                Else
                    Set m :='' (or '?' for a relaxed DTD)
                End
                If Length(rslt)>0 Then
                    Set rslt := rslt + ','
                End
                Set rslt := rslt + name + m
            End
        End
End
```

```
        Return rslt
End
GetAllReferences
Function GetAllReferences(in cls : Class, inout previousCls: String) Returns String
    If cls appears in previousCls, return the empty string
    Set parentRefs :=''
    For each parent Class of cls Do
        Set temp := GetAllReferences(parent Class)
        If Length(parentRefs)>0 and Length(temp)>0 Then
            Set parentRefs := parentRefs +','
        End
        Set parentRefs := parentRefs + temp
    End
    Set refs := GetReferences(cls)
    If Length(refs)>0 Then
        If Length(parentRefs)>0 Then
            Set parentRefs := parentRefs + ','
        End
    End
    Add cls to previousCls
    Return parentRefs + refs
End
GetReferences
Function GetReferences(in cls : Class) Returns String
    Set refs :=''
    For Each Reference contained in cls Do
        If Reference.exposedEnd.aggregation is not composite Then
            Set name := Qualified name of the Reference
            Set m := GetReferenceMultiplicity(Reference)
            Set temp := name + m
            If Length(refs)>0 Then
                Set refs := refs +','
            End
            Set refs := refs + temp
        End
    End
    Return refs
End
GetReferenceMultiplicity
Function GetReferenceMultiplicity(in ref:Reference) Returns String
    If Ref.referencedEnd.multiplicity is "0..1" Or
            Ref.referencedEnd.aggregation is composite Then
        Set m := '?'
    Else If Ref.referencedEnd.multiplicity is "1..*" Then
        Set m := '+' (or '*' for a relaxed DTD)
    Else IfRef.referencedEnd.multiplicity is not "1..1" Then
        Set m := '*'
    Else
        Set m := '' (or '?' for a relaxed DTD)
    End
    Return m
End
GetContainedClasses
Function GetContainedClasses(in cls : Class, inout previousCls : String) Returns String
    If cls appears in previousCls, return the empty string
    Set parentClasses := ''
    For each parent Class of cls Do
        Set temp := GetContainedClasses(parent Class)
        If Length(parentClasses)>0 and Length(temp)>0 Then
            Set parentClasses := parentClasses + ','
        End
        Set parentClasses := parentClasses + temp
    End
    Set classes := ''
    For Each Class contained in cls Do
        Set Temp := Qualified name of the contained Class
        If Length(classes)>0 Then
            Set classes := classes +'|'
        End
        Set classes := classes + Temp
    End
    If Length(classes)>0 Then
        If Length(parentClasses)>0 Then
            Set parentClasses := parentClasses + ','
        End
        Set classes = '(' + classes + ' + '*'
    End
    Add cls to previousCls
    Return parentClasses + classes
```

```
-continued

End
GetAllComposedRoles
Function GetAllComposedRoles(in cls : Class, inout previousCls : String) Returns String
    If cls appears in previousCls, return the empty string
    Set parentRoles := ''
    For each parent Class of cls Do
        Set temp := GetAllComposedRoles(parent Class)
        If Length(parentRoles)>0 and Length(temp)>0 Then
            Set parentRoles := parentRoles + ','
        End
        Set parentRoles := parentRoles + temp
    End
    Set roles := GetComposedRoles(cls)
    If Length(roles)>0 Then
        If Length(parentRoles)>0) Then
            Set parentRoles := parentRoles + ','
        End
    End
    Add cls to previousCls
    Return parentRoles + roles
End
GetComposedRoles
Function GetComposedRoles(in cls : Class) Returns String
    Set rslt :=''
    For Each Reference of cls Do
        If the aggregation of the AssociationEnd which is exposedEnd of the
                Reference is composite Then
            Set name := Qualified name of the Reference
            Set m := GetReferenceMultiplicity(the Reference)
            If Length(rslt)>0 Then
                Set rslt := rslt + ','
            End
            Set rslt := rslt + name + m
        End
    End
    Return rslt
End
GetClasses
Function GetClasses(in cls : Class, inout prevCls) Returns String
    If cls appears in prevCls, return the empty string ('')
    Set rslt := the qualified name of cls
    For Each subclass of cls Do
        Set Temp := GetClasses(the subclass, prevCls)
        If (Length(Temp)>0) Then
            Set rslt := rslt + '|'
        End
        Set rslt := rslt + Temp
    End
    Add cls to prevCls
    Return rslt
End
GetClassLevelAttributes
Function GetClassLevelAttributes(in pkg : Package) Returns String
    If pkg has a parent or containing Package Then
        Set parentAtts := GetClassLevelAttributes(parent Package)
    End
    Set atts := ''
    For Each Class of pkg Do
        Set temp := GetAttributes(the Class,'classifier')
        If Length(temp)>0 And Length (atts)>0 Then
            Set atts := atts + '|'
        End
        Set atts := atts + temp
    End
    If Length(atts)>0) then
        If Length(parentAtts)>0 Then
            Set parentAtts := parentAtts + ','
        End
        Set atts := '(' + atts + ')'
    End
    Return parentAtts + atts
End
GetNestedClassLevelAttributes
Function GetNestedClassLevelAttributes(in pkg : Package) Returns String
    Set rslt := ''
    For each Class of pkg Do
        Set temp := GetAttributes(the Class, 'classifier')
        If Length(temp)>0 Then
            If Length (rslt)>0) Then
```

-continued

```
                Set rslt := rslt + '|'
            End
            Set temp := '(' + temp + ')'
        End
        Set rslt := rslt + temp
    End
    For Each Package of Pkg
        Set childAtts := GetNestedClassLevelAttributes(contained Package)
        If Length(childAtts)>0 Then
            If Length(rslt)>0 Then
                Set rslt := '(' + rslt + ')' + ','
            End
            Set childAtts := '(' + childAtts + ')'
        End
        Set rslt := rslt + childAtts
    End
    Return rslt
End
GetPackageClasses
Function GetPackageClasses(in pkg : Package) Returns String
    If pkg has a parent or containing Package Then
        Set parentClasses := GetPackageClasses(parent Package)
    End
    Set classes :=''
    For Each Class of pkg Do
        Set Temp := Qualified name of the Class
        If Length(classes)>0 Then
            Set classes := classes + '|'
        End
        Set classes := classes + Temp
    End
    If Length(parentClasses)>0 and Length(classes)>0 Then
        Set parentClasses := parentClasses + '|'
    End
    Return parentClasses + classes
End
GetContainedPackages
Function GetContainedPackages(in pkg:Package) Returns String
    If pkg has a parent Package Then
        Set parentPkgs := GetContainedPackages(parent Package)
    End
    Set pkgs := ''
    For Each (sub) Package of pkg Do
        Set Temp := Qualified name of the (sub) Package.
        If Length(pkgs)>0 Then
            Set pkgs := pkgs + '|'
        End
        Set pkgs := pkgs + Temp
    End
    If Length(parentPkgs)>0 and Length(pkgs)>0 Then
        Set parentPkgs := pkgs + '|'
    End
    Return parentPkgs + pkgs
End
GetUnreferencedAssociations
Function GetUnreferencedAssociations(in pkg: Package) Returns String
    Set parentAssns := ''
    If pkg has a parent Package Then
        Set parentAssns := GetUnreferencedAssociations(parent Package)
    End
    Set assns := ''
    For each Association of pkg Do
        If isDerived is false Then
            If The Association has no References Then
                Set temp := qualified name of the Association
                If Length(assns)>0) then
                    Set assns := assns + '|'
                End
                Set assns := assns + temp
            End
        End
    End
    If Length(parentAssns>0 ) and Length(assns>0) Then
        Set parentAssns := parentAssns + '|'
    End
    Return parentAssns + assns
End
```

What is claimed is:

1. In a software development framework having repository and at least two software systems wherein said repository contains a meta-model and said software systems, which store instances of said meta-model, a method for enabling exchange of said instances of said meta-model among said software systems using a generalized data transfer language, said method comprising the steps of:
   a. extracting a fixed component and a variable component of said meta-model;
   b. parsing said variable component into constituent components;
   c. transforming each of said constituent components into corresponding component of a generalized software language;
   d. repeating steps b and c for each instance of said variable component;
   e. transforming each instance of said variable component into corresponding components of said generalized software language;
   f. transforming said fixed components into corresponding components of said generalized software language;
   g. distributing said corresponding components to another one of said software systems; and,
   h. using said distributed corresponding components to control the syntax of said generalized data transfer language to exchange said meta-model instances.

2. The method as in claim 1 wherein said meta-model is the Unified Modeling Language (UML).

3. The method in claim 1 wherein said data transfer language is eXtensible Markup Language (XML).

4. The method as in claim 1 wherein said generalized software language is the Documeut Type Definition (DTD) specification language for XML.

5. The method as in claim 1 wherein said software systems are software modeling tools.

6. A method according to claim 1 wherein said meta-model is a meta-metamodel with instances that are themselves meta-models.

7. A method as in claim 1 further including facilitating exchange of said software model data between two software systems.

8. A storage medium for use in a software developement framework having a repository and at least two software systems wherein said repository contains a meta-model and said software system, which store instances of said meta-model, said medium encoded with machine-readable computer program code for enabling exchange of said instances of said meta-model among said software systems using a generalized data transfer language, wherein when the computer program code is executed by a computer, the computer performs the steps of:
   a. extracting a fixed component and a variable component of said meta-model;
   b. parsing said variable component into constituent components;
   c. transforming each of said constituent components into corresponding components of a generalized software language;
   d. repeating steps b and c for each instance of said variable component;
   e. transforming each instance of said variable component into corresponding components of said generalized software language;
   f. transforming said fixed components into corresponding components of said generalized software language;
   g. distributing said corresponding components to another one of said software systems; and,
   h. using said distributed corresponding components to control the syntax of said generalized data transfer language to exchange said meta-model instances.

9. The medium as in claim 8 wherein said meta-model is the Unified Modeling Language (UML).

10. The medium as in claim 8 wherein said generalized data transfer language is eXtensible Markup Language (XML).

11. The medium as in claim 8 wherein said generalized software language is the Document Type Definition (DTD) specification language for XML.

12. The medium as in claim 8 wherein said software systems are software modeling tools.

13. A medium according to claim 8 wherein said meta-model is a meta-metamodel with instances that are themselves meta-models.

14. A medium as in claim 8 further including facilitating exchange of said software model data between two software systems.

15. In a software development framework having a repository and at least two software systems wherein said repository contains a meta-model and said software systems, which store instances of said meta-model, a method for enabling exchange of said instances of said meta-model among said software systems using a generalized data transfer language, said method comprising the steps of:
   a. mapping primary objects of said meta-model to constructs of said generalized data transfer language;
   b. mapping component parts and relationships of said primary meta-model objects to component constructs of said generalized data transfer language;
   c. mapping grouping mechanisms of said meta-model to grouping constructs of said generalized data transfer language;
   d. defining algorithms for traversing said meta-model to obtain information about said component parts and relationships of said primary components necessary for preserving said information in a process of transforming said component parts and relationships, primary objects and grouping mechanism into generalized software language contents used to express said constructs, component constructs and grouping constructs of said generalized data transfer language; and,
   e. expressing relationships among said generalized software language components, whereby reliable and correct programs to perform said transforming of said component parts and relationships, primary objects and grouping mechanisms into said generalized software language components can be written.

* * * * *